United States Patent
Zhou et al.

(10) Patent No.: US 12,261,668 B2
(45) Date of Patent: Mar. 25, 2025

(54) ENHANCED UE BEHAVIOR FOR BFD/BFR IN DRX MODE

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Yan Zhou, San Diego, CA (US); Ozcan Ozturk, San Diego, CA (US); Junyi Li, Fairless Hills, PA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/657,594

(22) Filed: Mar. 31, 2022

(65) Prior Publication Data
US 2023/0318680 A1 Oct. 5, 2023

(51) Int. Cl.
| | |
|---|---|
| H04B 7/06 | (2006.01) |
| H04W 24/10 | (2009.01) |
| H04W 52/02 | (2009.01) |
| H04W 76/19 | (2018.01) |

(52) U.S. Cl.
CPC .......... *H04B 7/0695* (2013.01); *H04W 24/10* (2013.01); *H04W 52/0232* (2013.01); *H04W 76/19* (2018.02)

(58) Field of Classification Search
CPC . H04B 7/0695; H04B 7/06964; H04W 24/10; H04W 52/0232; H04W 76/19; H04W 76/28
See application file for complete search history.

(56) References Cited

U.S. PATENT DOCUMENTS

| | | | | |
|---|---|---|---|---|
| 2016/0021699 | A1* | 1/2016 | Oh | H04W 76/28 |
| | | | | 370/311 |
| 2019/0014540 | A1* | 1/2019 | Fukuta | H04W 72/23 |
| 2020/0068457 | A1* | 2/2020 | You | H04L 1/0026 |
| 2020/0205219 | A1* | 6/2020 | Chen | H04W 76/19 |
| 2020/0245395 | A1* | 7/2020 | Zhang | H04L 5/0053 |

(Continued)

FOREIGN PATENT DOCUMENTS

| | | |
|---|---|---|
| WO | 2021163404 A1 | 8/2021 |
| WO | WO-2023192301 A2 * | 10/2023 ........ H04W 52/0216 |

OTHER PUBLICATIONS

International Search Report and Written Opinion—PCT/US2023/014116—ISA/EPO—Jun. 15, 2023.

*Primary Examiner* — Ayaz R Sheikh
*Assistant Examiner* — Mang Boi Thawng
(74) *Attorney, Agent, or Firm* — Procopio, Cory, Hargreaves & Savitch

(57) ABSTRACT

A UE may identify, during a first DRX ON period immediately preceding an existing DRX OFF period, that a first condition is met. The UE may transmit, to a network node, and the network node may receive, from the UE, a request to extend the first DRX ON period based on the first condition being met. The network node may transmit, to the UE, and the UE may receive, from the network node, an indication of approval of the request to extend the first DRX ON period. The UE and the network node may delay a beginning of the existing DRX OFF period by a first time period based on the approval of the request to extend the first DRX ON period.

30 Claims, 15 Drawing Sheets

(56) References Cited

U.S. PATENT DOCUMENTS

| | | | |
|---|---|---|---|
| 2021/0099956 A1* | 4/2021 | Nam | H04W 52/0235 |
| 2021/0235292 A1* | 7/2021 | Zhang | H04B 7/0695 |
| 2021/0259043 A1* | 8/2021 | Olvera-Hernandez | H04W 4/70 |
| 2021/0297139 A1* | 9/2021 | Kwon | H04W 52/028 |
| 2021/0337551 A1 | 10/2021 | Xia et al. | |
| 2022/0377756 A1* | 11/2022 | Sun | H04B 7/0695 |
| 2023/0088597 A1* | 3/2023 | Alfarhan | H04W 24/08 370/252 |

* cited by examiner

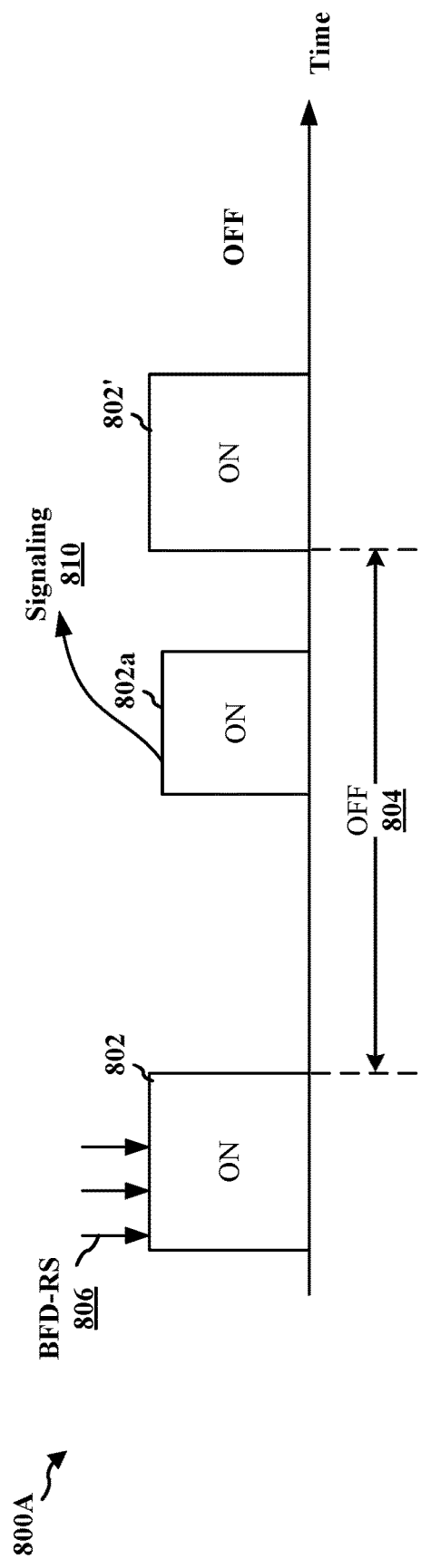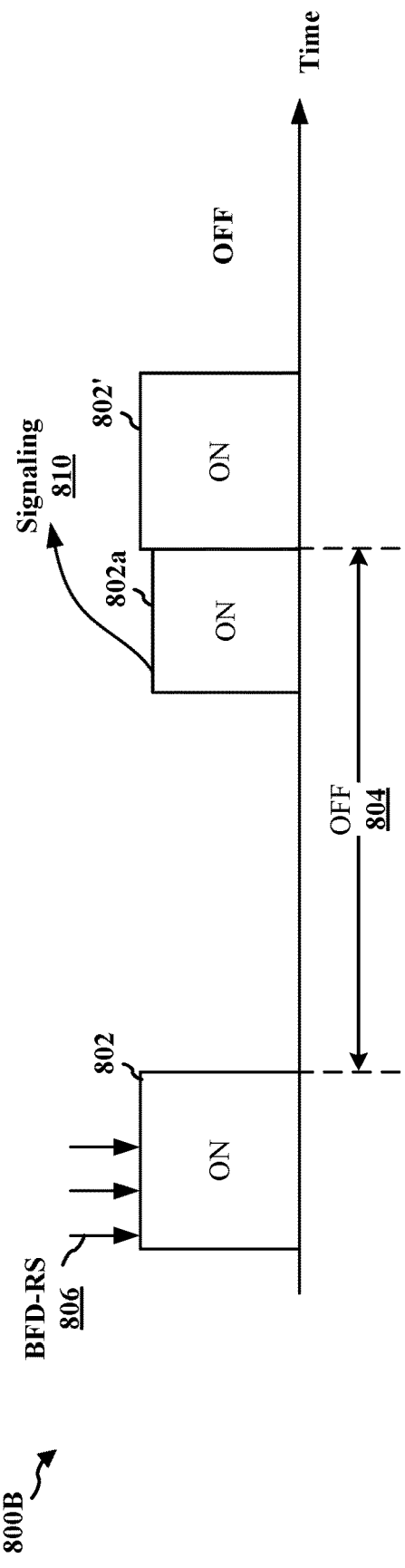
FIG. 8A
FIG. 8B

ENHANCED UE BEHAVIOR FOR BFD/BFR IN DRX MODE

TECHNICAL FIELD

The present disclosure relates generally to communication systems, and more particularly, to the discontinuous reception (DRX) mode in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify, during a first discontinuous reception (DRX) ON period immediately preceding an existing DRX OFF period, that a first condition is met. The apparatus may transmit, to a network node, a request to extend the first DRX ON period based on the first condition being met. The apparatus may receive, from the network node, an indication of approval of the request to extend the first DRX ON period. The apparatus may delay a beginning of the existing DRX OFF period by a first time period based on the approval of the request to extend the first DRX ON period.

In an aspect of the disclosure, a method, a computer-readable medium, and an apparatus are provided. The apparatus may be a network node. The apparatus may receive, from a UE, a request to extend a first DRX ON period immediately preceding an existing DRX OFF period based on a first condition being met. The apparatus may transmit, to the UE, an indication of approval of the request to extend the first DRX ON period. The apparatus may delay a beginning of the existing DRX OFF period by a first time period based on the approval of the request to extend the first DRX ON period.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 8A and 8B are diagrams illustrating an example procedure for waking up during an existing DRX OFF period.

DETAILED DESCRIPTION

Figure 1:
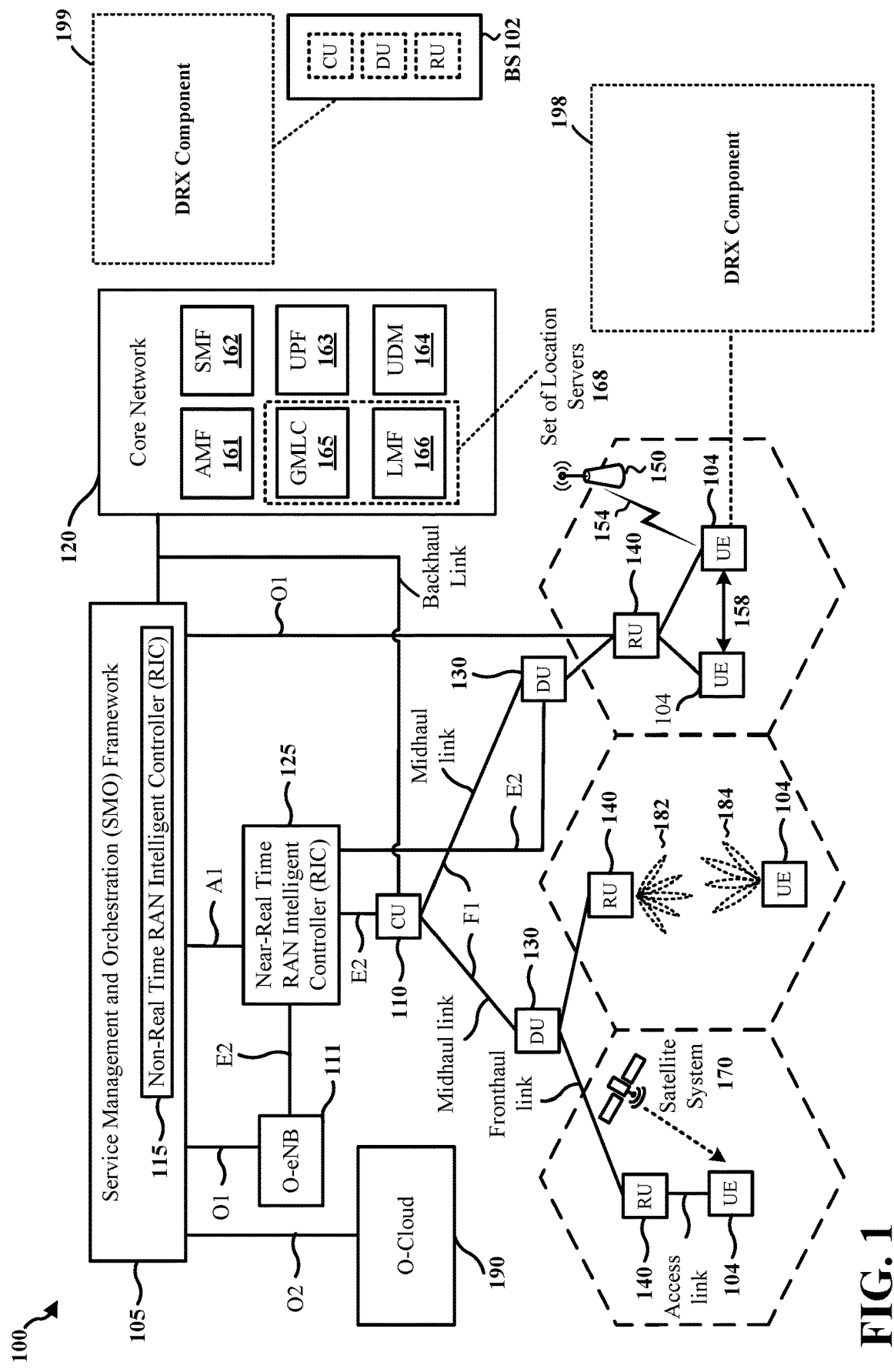
FIG. 1 is a diagram illustrating an example of a wireless communications system and an access network.

Beamforming may be a common technique in wireless communication. With beamforming, the transmission energy may be concentrated in a certain direction between a UE and a base station/network node to compensate for the potentially large data loss in high frequencies. Further, to maintain the good quality of the communicating beams, beam failure detection (BFD) and beam failure recovery (BFR) procedures may be utilized. When the UE is configured with the DRX mode, because the UE may not monitor the physical downlink control channel (PDCCH) during the DRX OFF periods, the UE may not properly perform the BFD/BFR procedures during the DRX OFF periods because the BFD-RSs used in the BFD procedure are transmitted via the PDCCH.

In one or more configurations, a UE may identify, during a first DRX ON period immediately preceding an existing DRX OFF period, that a first condition is met. The UE may transmit, to a network node, and the network node may receive, from the UE, a request to extend the first DRX ON period based on the first condition being met. The network node may transmit, to the UE, and the UE may receive, from the network node, an indication of approval of the request to extend the first DRX ON period. The UE and the network node may delay a beginning of the existing DRX OFF period by a first time period based on the approval of the request to extend the first DRX ON period. Accordingly, accuracy associated with the BFD/BFR procedures may be improved. Further, more time may be made available to the UE for BFD-RS monitoring during part of the originally scheduled DRX OFF period (the DRX ON extension period) in order to confirm beam failure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions.

Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DRX component 198 that may be configured to identify, during a first DRX ON period immediately preceding an existing DRX OFF period, that a first condition is met. The DRX component 198 may be configured to transmit, to a network node, a request to extend the first DRX ON period based on the first condition being met. The DRX component 198 may be configured to receive, from the network node, an indication of approval of the request to extend the first DRX ON period. The DRX component 198 may be configured to delay a beginning of the existing DRX OFF period by a first time period based on the approval of the request to extend the first DRX ON period. In certain aspects, the base station 102 may include a DRX component 199 that may be configured to receive, from a UE, a request to extend a first DRX ON period immediately preceding an existing DRX OFF period based on a first condition being met. The DRX component 199 may be configured to transmit, to the UE, an indication of approval of the request to extend the first DRX ON period. The DRX component 199 may be configured to delay a beginning of the existing DRX OFF period by a first time period based on the approval of the request to extend the first DRX ON period. Although the following description may be focused on 5G NR, the concepts described herein may be applicable to other similar areas, such as LTE, LTE-A, CDMA, GSM, and other wireless technologies.

Figure 2:
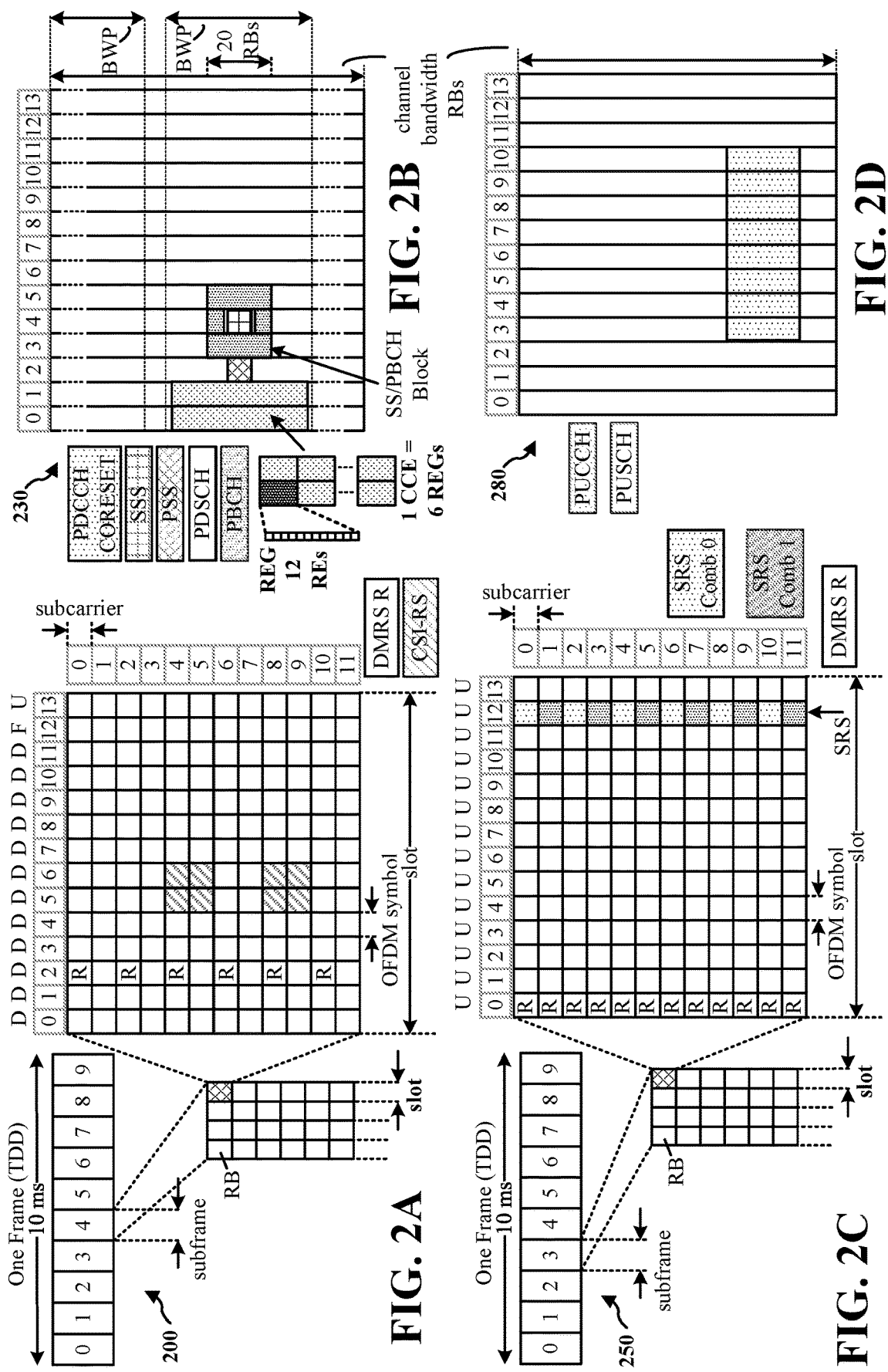
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
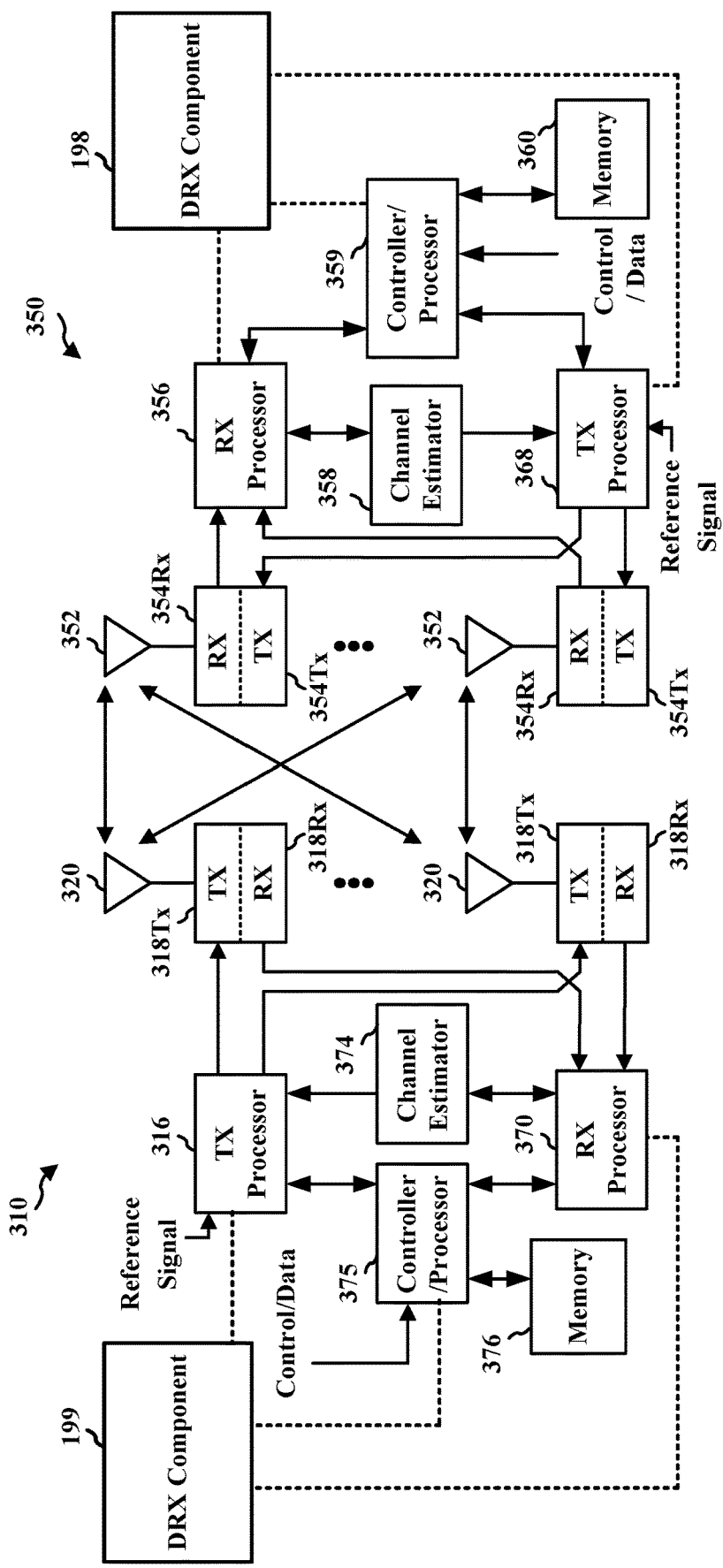
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DRX component 198 of FIG. 1.

At least one of the TX processor 316, the RX processor 370, and the controller/processor 375 may be configured to perform aspects in connection with the DRX component 199 of FIG. 1.

Beamforming may be a common technique in wireless communication. With beamforming, the transmission energy may be concentrated in a certain direction between a UE and a base station/network node to compensate for the potentially large data loss in high frequencies. Further, to maintain the good quality of the communicating beams, BFD and BFR procedures may be utilized.

Figure 4:
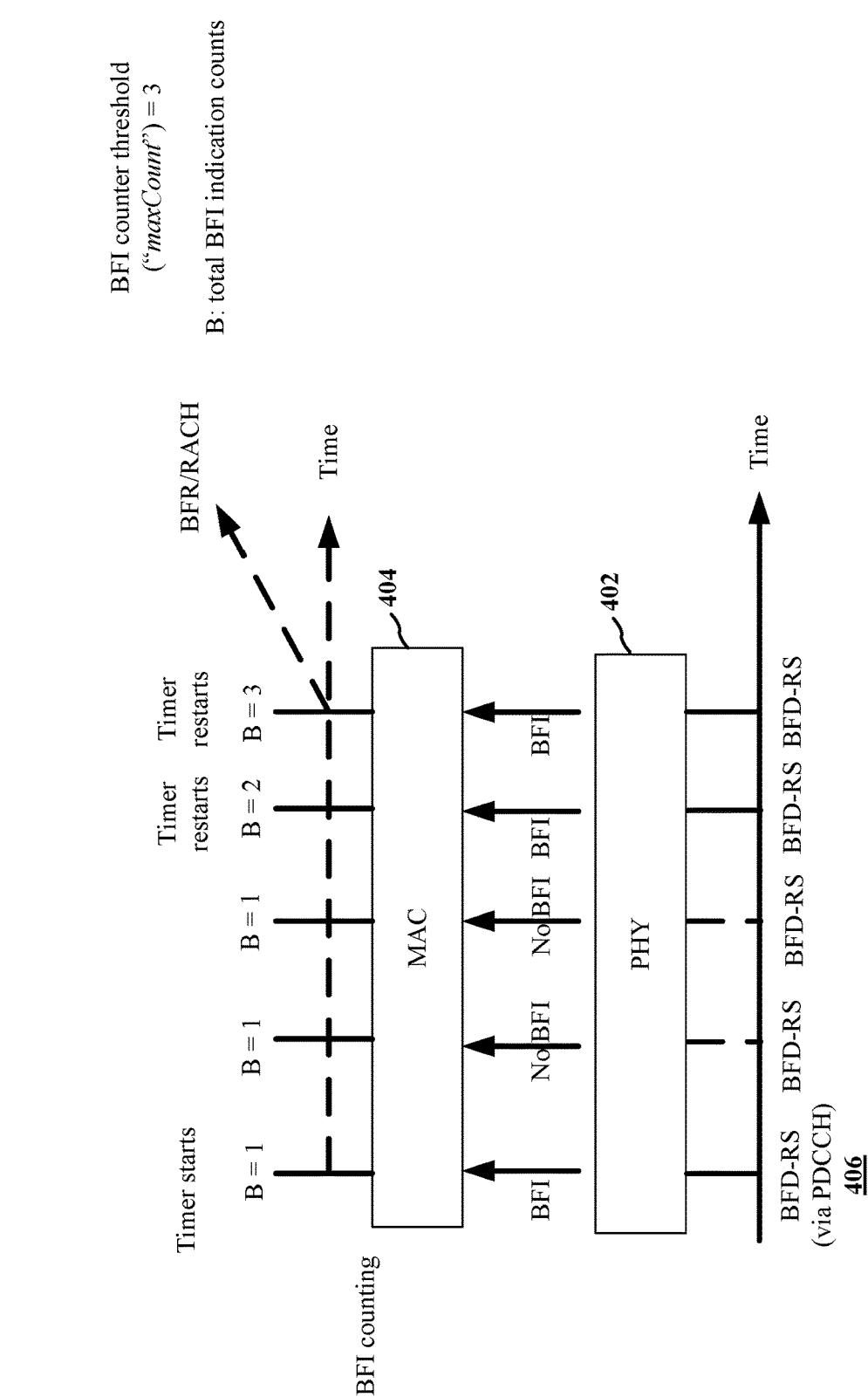
FIG. 4 is a diagram illustrating an example BFD procedure.

FIG. 4 is a diagram 400 illustrating an example BFD procedure. The radio link between a UE and a base station may be susceptible to blockage and degradation of RF signal, which may interrupt the communication link and cause beam failure. The UE may detect the beam failure in the BFD procedure, and may attempt to recover from the beam failure with the assistance of the BFR procedure. The BFD procedure and the BFR procedure may be a combined effort of the UE PHY layer 402 and MAC layer 404 procedures without involvement of higher layer signaling.

In particular, if the UE communicates with the base station using a beam pair (which may include one UE beam and one base station beam), the base station may periodically transmit a BFD-RS 406 (e.g., via a PDCCH) to the UE using the corresponding base station beam. For example, the BFD-RS may be a CSI-RS or an SSB. At each BFD-RS occasion (i.e., the occasion when the base station transmits the BFD-RS), the UE may measure the BFD-RS using the corresponding UE beam. Based on the measurement, if the estimated hypothetical PDCCH block error ratio (BLER) is greater than a threshold (e.g., 10%) (which may indicate that a radio link quality associated with the UE beam is less than a corresponding threshold), the UE PHY layer 402 may report a beam failure instance (BFI) to the UE MAC layer 404.

The UE MAC layer 404 may count the indications of the BFIs (i.e., BFI indications) from the UE PHY layer 402, and may initiate the BFR procedure when the BFI counter has reached or exceeded a configured BFI counter threshold (e.g., the value of the "maxCount" parameter). In particular, every time the UE MAC layer 404 receives an indication of a BFI from the UE PHY layer 402, the UE MAC layer 404 may start or restart a timer (e.g., a BFD timer), and may increment the BFI counter by 1. When the BFI counter reaches or exceeds the corresponding BFI counter threshold (e.g., in the illustrated example, the BFI counter threshold may be 3), the UE MAC layer 404 may declare a beam failure, and the UE MAC layer 404 may initiate the BFR procedure in an attempt to recover from the beam failure. In the BFR procedure, the UE may perform a random access channel (RACH) procedure using a new candidate beam. If the UE MAC layer 404 does not receive an additional BFI indication before the timer (e.g., the BFD timer) expires, the UE MAC layer 404 may reset the BFI counter (e.g., to '0'). In other words, if a certain period of time has lapsed since the last BFI indication without receiving an additional BFI indication from the UE PHY layer 402, the UE MAC layer 404 may assume that there is no beam failure.

Figure 5:
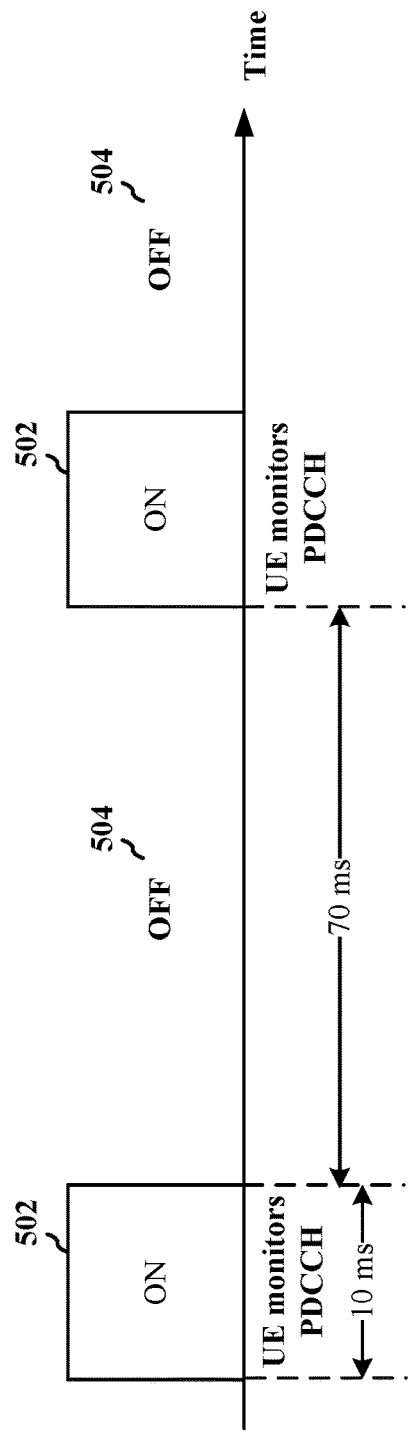
FIG. 5 is a diagram illustrating an example timeline associated with the DRX mode.

FIG. 5 is a diagram 500 illustrating an example timeline associated with the DRX mode. In order to reduce power consumption, a UE may be configured with the DRX mode. In particular, based on the DRX mode, the UE may be configured with periodic and alternating DRX ON periods 502 and DRX OFF periods 504. The UE may wake up, and may stay active during each of the DRX ON periods 502. The UE may monitor the PDCCH during the DRX ON periods 502 of the UE to find out whether there is uplink or downlink data transmission scheduled for the UE. Herein a DRX ON period 502 may also be referred to as a DRX ON duration. In contrast, the UE may enter a sleep state during each of the DRX OFF periods 504. The UE may not monitor the PDCCH during the DRX OFF periods of the UE.

Therefore, because the UE may not monitor the PDCCH during the DRX OFF periods 504, the UE may not properly perform the BFD/BFR procedures during the DRX OFF periods 504 because the BFD-RSs used in the BFD procedure are transmitted via the PDCCH.

Figure 6A:
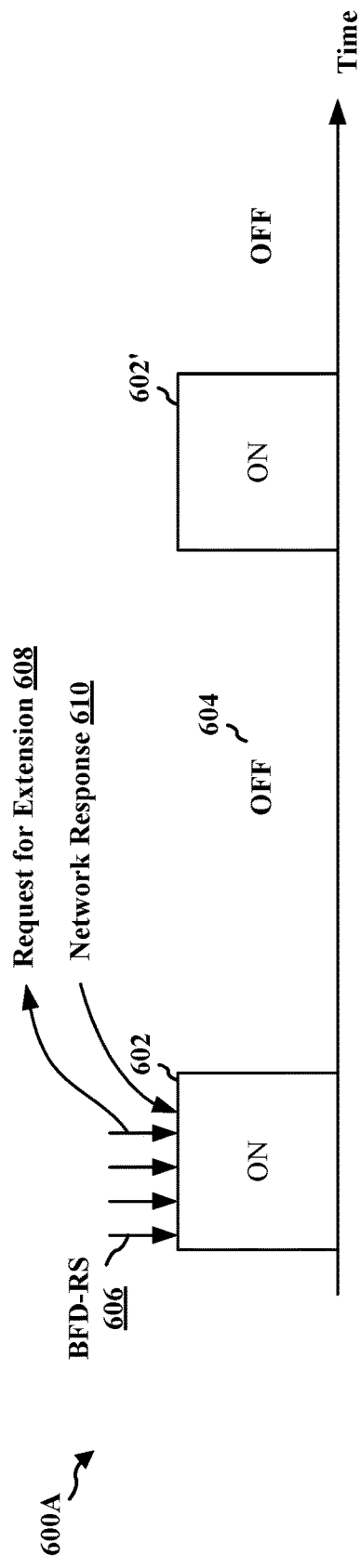
FIGS. 6A and 6B are diagrams illustrating an example procedure for extending a present DRX ON period.
Figure 6B:
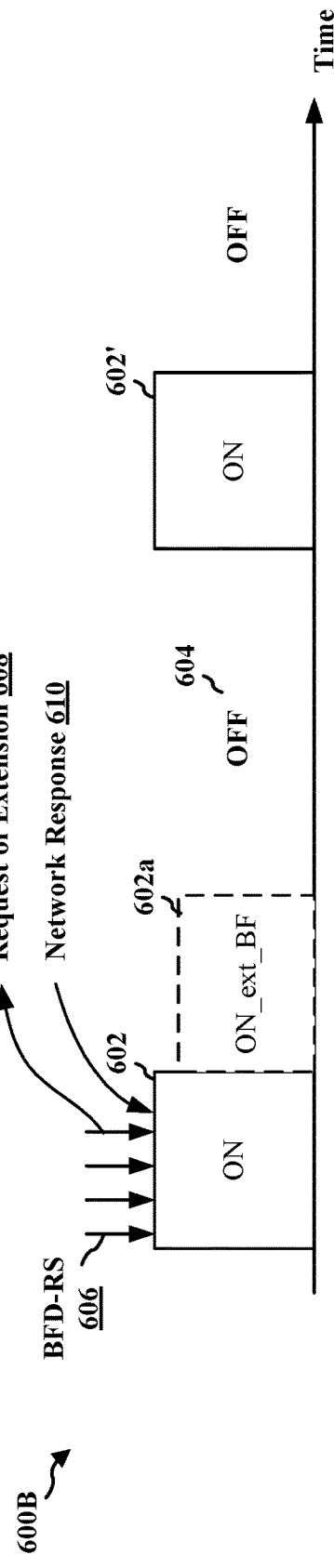

FIGS. 6A and 6B are diagrams 600A and 600B illustrating an example procedure for extending a present DRX ON period. The UE may perform the BFD procedure based on the BFD-RSs 606. In one or more configurations, a UE may request an extension of the present DRX ON period 602 when a condition (e.g., a triggering condition) is met. In one or more configurations, whether the condition is met may be identified when there is less than a prespecified time period (e.g., y ms) left until the end of the present DRX ON period 602. In one configuration, the condition may be met if a current BFI count is greater than a corresponding threshold. In one configuration, the condition may be met if during a current BFD session, more than a prespecified number (e.g., N) of consecutive BFIs have been recorded. In one configuration, the condition may be met if the UE identifies a (sudden) channel strength drop (decrease) that is greater than a corresponding threshold (e.g., x dB).

In one or more configurations, if the condition is met, the UE may transmit (e.g., via a MAC—control element (CE) (MAC-CE) or a UCI message), to the network node, a request 608 for an extension of the present DRX ON period 602. Subsequent to transmitting the request 608 for the extension of the present DRX ON period 602, the UE may monitor for a response from the network node. The UE may receive, from the network node, a response 610 to the request 608 for the extension of the present DRX ON period 602. For example, the response 610 may indicate an approval of the request 608 for the extension of the present DRX ON period 602. In another example, the response 610 may indicate a denial of the request 608 for the extension of the present DRX ON period 602.

In one or more configurations where the request 608 is approved, in addition to the approval of the request 608 for the extension of the present DRX ON period 602, the response 610 may further indicate that a prespecified DRX ON extension period/value (corresponding to the length of the period by which the DRX ON duration is extended) may be used for the approved extension. Accordingly, the UE may be preconfigured with one or more prespecified DRX ON extension periods/values. In one or more configurations, the response 610 may further indicate a new DRX ON extension period/value associated with the approval. For example, a new DRX ON extension period/value may be indicated if the UE is not preconfigured with DRX ON extension periods/values, or if the network node chooses to change a DRX ON extension period/value preconfigured with the UE. In one or more configurations, the UE may extend the present DRX ON period 602 based on the configured or prespecified DRX ON extension period/value (e.g., the present DRX ON period 602 may be extended to include the DRX ON extension period 602*a*).

In one or more configurations, the response 610 may indicate a denial of the request 608 for the extension of the present DRX ON period 602. Accordingly, if the response 610 indicates a denial, the UE may enter the existing (e.g., preconfigured) DRX OFF period 604 at the end of the present DRX ON period 602 as originally configured without extending the present DRX ON period 602. Further, the UE may wake up at the next DRX ON period 602' at the end of the existing DRX OFF period 604 as originally configured.

In one or more configurations, the network node may configure the UE (e.g., via RRC signaling) with one or more DRX ON period extension configurations. For example, in one or more configurations, the network node may configure the UE (e.g., via RRC signaling) with the condition that may trigger the UE to transmit the request 608 for the extension of the present DRX ON period. In one or more configurations, the network node may preconfigure the UE (e.g., via RRC signaling) with one or more prespecified DRX ON extension periods/values (e.g., the duration of the DRX ON extension period 602*a*). In one or more configurations, the network node may preconfigure the UE (e.g., via RRC signaling) with multiple options for at least some of the above-described configuration parameters, and may use a MAC-CE or a DCI message to switch between the configuration options.

Accordingly, accuracy associated with the BFD/BFR procedures may be improved.

Further, more time may be made available to the UE for BFD-RS monitoring during part of the originally scheduled DRX OFF period (the part may correspond to the DRX ON extension period) in order to confirm beam failure. Accordingly, timelier or prompter BFR may be performed as appropriate, while superfluous BFR procedures may be avoided. Moreover, the future beam quality may be improved. In particular, with the UE triggered reporting, the network may understand the BFD status of the UE more comprehensively, and may select more suitable beams for the UE in the future. Additional advantages may include improved quality of service (QoS), enhanced beam connection consistency, reduced latency, and/or improved reliability.

Referring back to FIG. 5, the UE may experience difficulties if during a DRX OFF period 504, the UE wants to communicate with the network node regarding a certain situation before the next DRX ON period 502. For example, in a virtual reality (VR)/augmented reality (VR)/extended reality (XR) application, it may be appropriate or desirable for the pose updating information to be transmitted timely (e.g., with a 10 ms deadline). In such as case, a preconfigured DRX OFF period may be overly long (e.g., a preconfigured DRX OFF period may be approximately 70 ms long). Further, in this case, it may be appropriate or desirable for the UE to maintain a satisfactory beam condition even during a DRX OFF period, so that fast pose update may be achieved when appropriate. It should be appreciated that during a DRX OFF period 504, resources available to the UE may be limited. Further, the network node may assume that the UE is asleep during the DRX OFF period 504 according to the DRX configuration, and accordingly may not monitor the signaling from the UE.

Referring back to FIGS. 6A and 6B, in one or more configurations, a UE may request an extension of the present DRX ON period 602 when a condition (e.g., a triggering condition) is met. In one or more configurations, whether the condition is met may be identified when there is less than a prespecified time period (e.g., x ms) left until the end of the present DRX ON period 602. In one configuration, the condition may be met if the UE has new uplink data to transmit to the network node, which transmission may not be completed within the present DRX ON period 602 as originally configured, and chooses not to wait for the next DRX ON period to complete the transmission (e.g., due to a QoS specification). In one configuration, the condition may be met if the UE is aware that the network node has more data to transmit to the UE, which transmission may not be completed within the present DRX ON period 602 as originally configured, and chooses to receive the data during the present DRX ON period 602. In one configuration, the condition may be met if the UE predicts a potential beam failure between the UE and the network node that may happen during the existing DRX OFF period 604 immediately subsequent to the present DRX ON period 602.

In one or more configurations, similar to the configurations described above, if the condition is met, the UE may transmit (e.g., via a MAC-CE or a UCI message), to the network node, a request 608 for an extension of the present DRX ON period 602. Subsequent to transmitting the request 608 for the extension of the present DRX ON period 602, the UE may monitor for a response from the network node. The UE may receive, from the network node, a response 610 to the request 608 for the extension of the present DRX ON period 602.

In one or more configurations, the network node may configure the UE (e.g., via RRC signaling) with one or more DRX ON period extension configurations. For example, in one or more configurations, the network node may configure the UE (e.g., via RRC signaling) with one or more conditions that may trigger the UE to transmit a DRX ON period extension request 608 to the network node. In one or more configurations, the network node may configure the UE (e.g., via RRC signaling) with the format (content format) of the DRX ON period extension request 608. In particular, the content of the DRX ON period extension request 608 may be different based on the condition that triggered the request 608. For example, different MAC-CEs may be used for different triggering conditions or causes. In one or more configurations, the network node may configure the UE (e.g., via RRC signaling) with one or more preconfigured DRX ON extension periods/values (e.g., x ms, a period/value pool including {a, b, c,} (ms), etc.). In one or more configurations, the network node may configure the UE (e.g., via RRC signaling) with the signaling methods (e.g., MAC-CE or UCI) for transmitting the request 608 to the network node. In one or more configurations, the network node may configure the UE (e.g., via RRC signaling) with the resources that the UE may use to transmit the request 608. In one or more configurations, the network node may configure the UE (e.g., via RRC signaling) with the resources the UE may monitor for the response to the DRX ON period extension request 608 from the network node. In one or more configurations, the network node may preconfigure the UE (e.g., via RRC signaling) with multiple options for at least some of the above-described configuration parameters, and may use a MAC-CE or a DCI message to switch between the configuration options.

In one or more configurations, the condition that may trigger the DRX ON period extension request 608 may be urgent new uplink or downlink data transmission that may not wait until the next DRX ON period. Accordingly, to transmit a response 610 to the DRX ON period extension request 608 triggered by the new data transmission, the network node may transmit, to the UE, an indication via a PDCCH before the end of the present DRX ON period 602 to enable or authorize an extension of the present DRX ON period 602. In addition to the approval of the DRX ON period extension request 608, if the urgent new data transmission is in the uplink, the network node may further transmit, to the UE, an uplink grant for the new uplink data transmission from the UE. If the urgent new data transmission is in the downlink, the network node may further transmit, to the UE, an indication of the downlink data transmission.

In one or more configurations, the inactivity timer duration may be reused as the DRX ON extension period/value. In one or more configurations, the network node may indicate a prespecified DRX ON extension period/value according to a preconfiguration, or may indicate a new DRX ON extension period/value.

In one or more configurations, the condition that may trigger the DRX ON period extension request 608 may be a predicted beam failure. Accordingly, the network node may indicate, to the UE, that the UE may monitor the BFD-RSs during the DRX ON extension period 602*a*. In some configurations, the network node may further indicate, to the UE, that the UE may not monitor other PDCCH indications not including BFD-RSs during the DRX ON extension period 602*a*. Accordingly, the UE may save power because it may not monitor the other PDCCH indications during the DRX ON extension period 602*a*. In one or more configurations, the network node may indicate a prespecified DRX ON extension period/value according to a preconfiguration, or may indicate a new DRX ON extension period/value.

In one or more configurations, the UE or the network node may activate or deactivate the procedure/mechanism of UE triggered DRX ON period extension. In particular, the UE may transmit, to the network node via a MAC-CE or a UCI message, a request to activate or deactivate the mechanism of UE triggered DRX ON period extension. Further, the network node may activate or deactivate the mechanism of UE triggered DRX ON period extension via a MAC-CE or a DCI message.

The activation or deactivation of the mechanism of UE triggered DRX ON period extension may be based on one or more of a length of a DRX ON period, a length of a DRX OFF period, a QoS specification of the serving traffic, a UE power constraint, a UE capability constraint, or overall network loading, etc.

Therefore, the QoS of the serving traffic may be improved. Further, the beam quality between the UE and the network node may be improved. Moreover, communication latency may be reduced.

In order to accurately and promptly detect beam failure, in one or more configurations, the UE may perform BFD-related procedures in a DRX OFF period. The UE may perform the BFD procedures in selected DRX OFF periods as appropriate. In other words, the UE may not perform the BFD procedure in every DRX OFF period. Further, even if the BFD procedure is performed during a DRX OFF period, the UE activity may be reduced or limited during the DRX OFF period in order to preserve the purpose and advantages of the DRX mode.

Figure 7:
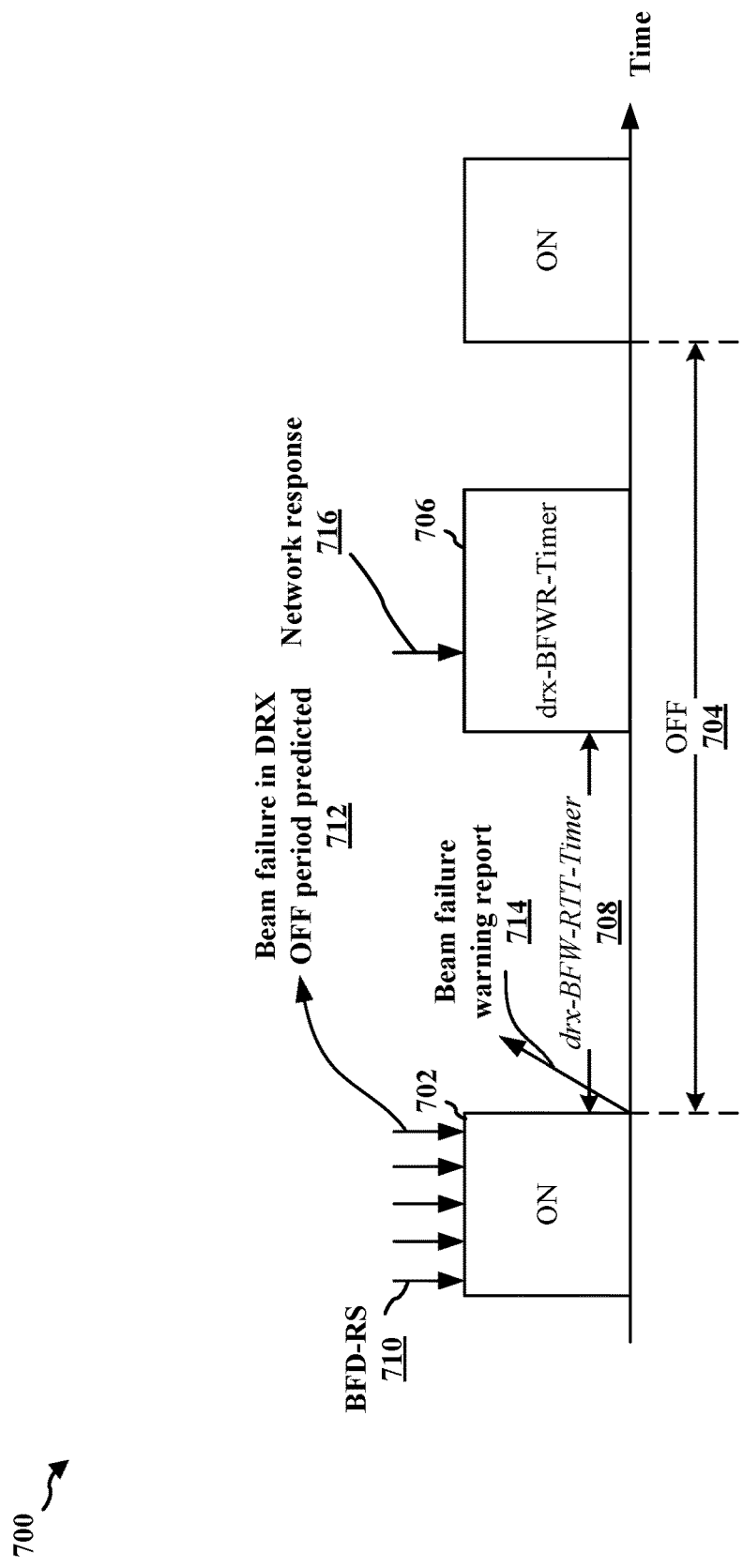
FIG. 7 is a diagram illustrating an example procedure for transmitting a beam failure warning report in association with the DRX mode.

With advances in UE technology, the UE may predict a beam failure that may happen in the near future. For example, the UE may predict a beam failure based on machine learning algorithms. In addition, the UE may predict a beam failure with the assistance of a camera and/or other sensors that may help to detect or predict beam blocking. FIG. 7 is a diagram illustrating an example procedure 700 for transmitting a beam failure warning report in association with the DRX mode. The UE may perform the BFD procedure based on the BFD-RSs 710. In one or more configurations, upon predicting at 712 (i.e., before the end of the present DRX ON period 702) that there may be a beam failure during an upcoming existing DRX OFF period 704, the UE may transmit, to the network node (e.g., via a MAC-CE or a UCI message), a beam failure warning report 714. Then, after a delay based on a timer, the UE may monitor for a response 716 to the beam failure warning report 714 from the network node. In particular, after transmitting the beam failure warning report 714, the UE may start a timer 708 (e.g., a "drx-BFW-RTT-Timer" timer, where "BFW" may refer to the beam failure warning, and "RTT" may refer to the round trip time). At or immediately after the expiration of the timer 708, the UE may start a timer 706 (e.g., a "drx-BFWR-Timer" timer, where "BFWR" may refer to the beam failure warning response). For the duration of the timer 706 (i.e., after the start of the timer 706 and before the expiration of the timer 706), the UE may monitor for a response 716 to the beam failure warning report 714 from the network node. In particular, the response 716 from the network node (which may be transmitted via a MAC-CE or a DCI message) may include an indication/command to switch the downlink beam.

Accordingly, because the UE may monitor for the response 716 from the network node during the duration of the timer 706, the UE may not monitor the PDCCH for the response 716 from the network node during the whole DRX OFF period 704. Therefore, the UE power consumption may be reduced, and the purpose and advantages of the DRX mode preserved. In one or more configurations, the beam failure warning report 714 may indicate that it is predicted that a beam failure is to happen during the upcoming DRX OFF period 704. Further, the beam failure warning report 714 may include at least one of a channel measurement report, one or more BFI counts, one or more BFI patterns, or a BFI history, etc.

In one or more configurations, the network node may configure the UE (e.g., via RRC signaling) with one or more beam failure warning report configurations. For example, in one or more configurations, the network node may configure the UE (e.g., via RRC signaling) with one or more conditions that may trigger the UE to transmit a beam failure warning report 714. For example, the conditions may include one or more of a predicted beam failure in the upcoming DRX OFF period, a number (e.g., N) of consecutive BFIs that is greater than a threshold, a total BFI count that is greater than a threshold (e.g., the threshold may be x % of the "maxCount" threshold), etc. In one or more configurations, the network node may configure the UE (e.g., via RRC signaling) with a format (content format) of the beam failure warning report 714. In one or more configurations, the network node may configure the UE (e.g., via RRC signaling) with the duration of the "drx-BFW-RTT-Timer" timer. In one or more configurations, the network node may configure the UE (e.g., via RRC signaling) with the duration of the "drx-BFWR-Timer" timer.

In one or more configurations, the network node may preconfigure the UE (e.g., via RRC signaling) with multiple options for at least some of the above-described configuration parameters, and may use a MAC-CE or a DCI message to switch between the configuration options.

In one or more configurations, the UE or the network node may activate or deactivate the procedure/mechanism of UE beam failure warning reporting. In particular, the UE may transmit, to the network node via a MAC-CE or a UCI message, a request to activate or deactivate the mechanism of UE beam failure warning reporting. Further, the network node may activate or deactivate the mechanism of UE beam failure warning reporting via a MAC-CE or a DCI message. Moreover, the network node may transmit, to the UE via the MAC-CE or the DCI message, a configuration or an indication of a change in the configuration of the format (content format) of the beam failure warning report.

The activation or deactivation of the mechanism of UE beam failure warning reporting may be based on one or more of a UE autonomy capability, a QoS specification of the serving traffic, a UE DRX configuration (e.g., a length of a DRX cycle, a length of a DRX ON period, a length of a DRX OFF period, etc.), a power constraint of the UE, or a capacity constraint of the UE, etc.

As described above, the beam failure prediction may be an enhancement of the wireless communication system that also may take advantage of machine learning/artificial intelligence technologies. Therefore, based on the mechanism of UE beam failure warning reporting, more accurate and prompter BFD and/or BFR procedures may be performed. The beam failure warning report may serve as a "heads-up" to the network node regarding a potential beam failure. Further, the downlink beam switching initiated by the network node may be a faster way of beam recovery as compared to the RACH procedure. Moreover, the beam failure warning reporting and the response monitoring during the DRX OFF period may enable prompt BFD and BFR procedures. In addition, UE power consumption may be reduced because beam switching may be associated with less power consumption compared to the RACH procedure. The UE may preserve the purpose and advantages of the DRX mode, and may send the beam failure warning report as appropriate (i.e., the UE may not send the beam failure warning report when not appropriate). Additional advantages associated with the beam failure warning reporting may include one or more of improved QoS, an enhanced beam connection consistency, a reduced latency, or an improved reliability.

Referring back to FIG. 5, in one or more configurations, if the UE performs the BFD procedure during a DRX ON period 502, a short DRX ON period 502 may not provide the UE with enough time to determine the beam quality. Further, a long DRX OFF period 504 may mean that the UE may wait for a considerable amount of time before the UE may resume the beam quality measurements after the last DRX ON period 502. Accordingly, beam quality degradation may occur as a result, especially when the QoS specification of the current traffic is stringent.

Accordingly, in one or more configurations, the UE may wake up during a (long) DRX OFF period 504 based on a configuration. During such a supplemental wakeup period, the UE may perform BFD and/or BFR procedures.

FIGS. 8A and 8B are diagrams 800A and 800B illustrating an example procedure for waking up during an existing DRX OFF period. The UE may perform the BFD procedure based on the BFD-RSs 806. The UE may wake up during the existing DRX OFF period 804 if a (triggering) condition is met. In one or more configurations, the network node may preconfigure resources and/or parameters for the signaling 810 associated with the supplemental wakeup for the UE. In one or more configurations, the condition may be met if the duration of the existing DRX OFF period 804 is greater than a prespecified multiple (e.g., x times) of the duration of a DRX ON period (e.g., a DRX ON period 802/802', or another suitable reference DRX ON period).

In one or more configurations, the network node may configure the UE (e.g., via RRC signaling) with the condition that may trigger the UE to perform the supplemental wakeup. In one or more configurations, the network node may configure the UE (e.g., via RRC signaling) with the waking-up timing and/or the waking-up period/duration associated with the supplemental wakeup during the DRX OFF period (e.g., the waking-up timing and/or the waking-up period/duration of the supplemental DRX ON period 802a). In one or more configurations, the network node may configure the UE (e.g., via RRC signaling) with the resources that the UE may use for the signaling 810 associated with the supplemental wakeup during the DRX OFF period. In one or more configurations, the network node may configure the UE (e.g., via RRC signaling) with the resources that the UE may use for monitoring for the response from the network node after the UE transmits the signaling 810 associated with the supplemental wakeup.

In FIG. 8A, the supplemental DRX ON period 802a may be in the middle of the existing DRX OFF period 804 (i.e., a gap may exist between the supplemental DRX ON period 802a and the subsequent DRX ON period 802'). In FIG. 8B, the supplemental DRX ON period 802a may represent or correspond to an early beginning of the subsequent DRX ON period 802' (i.e., there may be no gap between the supplemental DRX ON period 802a and the subsequent DRX ON period 802').

In one or more configurations, the network node may preconfigure the UE (e.g., via RRC signaling) with multiple options for at least some of the above-described configuration parameters, and may use a MAC-CE or a DCI message to switch between the configuration options.

In one or more configurations, the UE may transmit, to the network node, the signaling 810 associated with the supplemental wakeup. The signaling 810 associated with the supplemental wakeup may indicate that the UE is active during the supplemental DRX ON period 802a, where the supplemental DRX ON period 802a may be within the existing DRX OFF period 804. In one or more configurations, the signaling 810 may indicate the supplemental wakeup based on one or more preconfigured parameters. In one or more configurations, signaling 810 may indicate that the supplemental wakeup may represent or correspond to an early beginning of a subsequent DRX ON period 802' (e.g., as shown in FIG. 8B).

In one or more configurations, the UE or the network node may activate or deactivate the procedure/mechanism of supplemental wakeup during an existing DRX OFF period. In particular, the UE may transmit, to the network node via a MAC-CE or a UCI message, a request to activate or deactivate the mechanism of supplemental wakeup during an existing DRX OFF period. Further, the network node may activate or deactivate the mechanism of supplemental wakeup during an existing DRX OFF period via a MAC-CE or a DCI message.

The activation or deactivation of the mechanism of supplemental wakeup during an existing DRX OFF period may be based on one or more of a length of a DRX ON period, a length of a DRX OFF period, a QoS specification of the serving traffic, a UE power constraint, a UE capability constraint, or overall network loading, etc.

Therefore, based on the supplemental wakeup during an existing DRX OFF period, the UE may wake up during a (long) DRX OFF period to measure the beam quality in a timely manner. Accordingly, the latency in the response by the UE or the network node to a potential beam issue may be reduced. Additional advantages associated with the supplemental wakeup during an existing DRX OFF period may include one or more of an improved beam quality, reduced or avoided BFIs, or improved QoS of the serving traffic.

Figure 9:
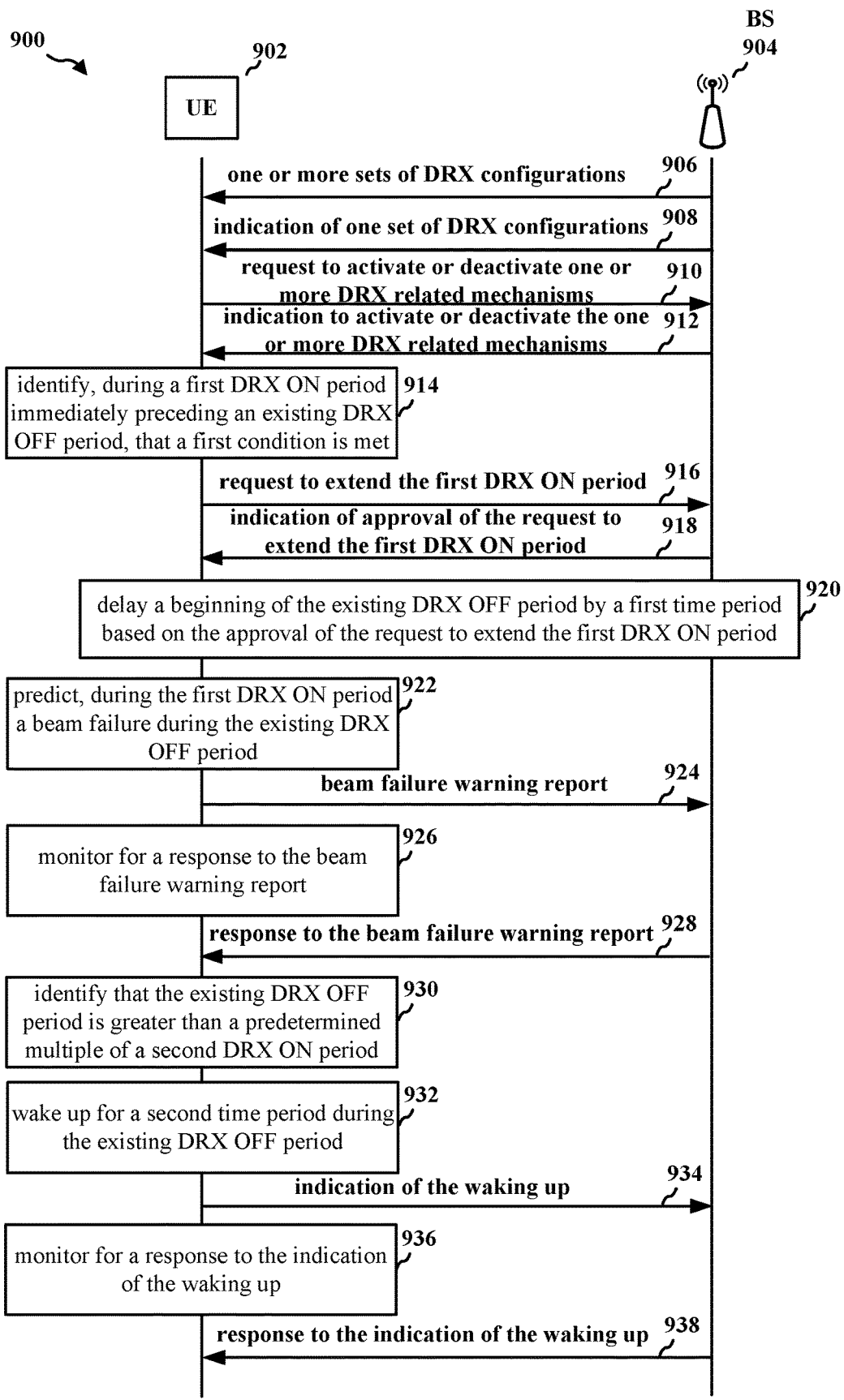
FIG. 9 is a diagram of a communication flow of a method of wireless communication.

FIG. 9 is a diagram of a communication flow 900 of a method of wireless communication. At 906, the network node 904 may transmit, to the UE 902, and the UE 902 may receive, from the network node 904, via RRC signaling, one or more sets of DRX configurations.

In one configuration, at least one set of DRX configurations in the one or more sets of DRX configurations may include at least one of a DRX ON period extension configuration, a beam failure warning configuration, or a supplemental DRX wakeup configuration.

At 908, the network node 904 may transmit, to the UE 902, and the UE 902 may receive, from the network node 94, via a second MAC-CE or a first DCI message, an indication of one set of DRX configurations in the one or more sets of DRX configurations.

At 910, the UE 902 may transmit, to the network node 904, and the network node 904 may receive, from the UE 902, via a third MAC-CE or a second UCI message, a request to activate or deactivate one or more DRX related mechanisms.

In one configuration, the one or more DRX related mechanisms may include one or more of a DRX ON period extension mechanism, a beam failure warning mechanism, or a supplemental DRX wakeup mechanism.

At 912, the network node 904 may transmit, to the UE 902, and the UE 902 may receive, from the network node 904, via a fourth MAC-CE or a second DCI message, an indication to activate or deactivate the one or more DRX related mechanisms.

At 914, the UE 902 may identify, during a first DRX ON period immediately preceding an existing DRX OFF period, that a first condition is met.

In one or more configurations, the first condition is met if a first number of BFI indicators is greater than a first threshold, a second number of consecutive BFI indicators is greater than a second threshold, a channel strength decreases by more than a third threshold, the UE has more data to transmit to the network node during the first DRX ON period than possible without extending the first DRX ON period, the network node has more data to transmit to the UE during the first DRX ON period than possible without extending the first DRX ON period, or the UE predicts a beam failure during the existing DRX OFF period.

At 916, the UE 902 may transmit, to the network node 904, and the network node 904 may receive, from the UE 902, a request to extend the first DRX ON period based on the first condition being met.

In one configuration, the request 916 to extend the first DRX ON period may be transmitted and received via a first MAC-CE or a first UCI message.

At 918, the network node 904 may transmit, to the UE 902, and the UE 902 may receive, from the network node 904, an indication of approval of the request to extend the first DRX ON period.

In one configuration, the approval of the request to extend the first DRX ON period may include an indication of the first time period. In one configuration, the indication of the approval of the request to extend the first DRX ON period may be transmitted and received via a PDCCH.

At 920, the UE 902 and the network node 904 may delay a beginning of the existing DRX OFF period for the UE 902 by a first time period based on the approval of the request to extend the first DRX ON period.

At 922, the UE 902 may predict, during the first DRX ON period, a beam failure during the existing DRX OFF period.

At 924, the UE 902 may transmit, to the network node 904, and the network node 904 may receive, from the UE 902, a beam failure warning report based on the predicting of the beam failure.

In one configuration, the beam failure warning report may include at least one of a channel measurement report, a BFI count, a BFI pattern, or a BFI history.

At 926, the UE 902 may monitor, for a predetermined second time period during the existing DRX OFF period after an expiry of a first timer, for a response to the beam failure warning report from the network node 904. The first timer may be started at the beginning of the existing DRX OFF period.

At 928, the network node 904 may transmit, during the predetermined second time period during the existing DRX OFF period after an expiry of a first timer, to the UE 902, and the UE 902 may receive, from the network node 904, a response to the beam failure warning report 924.

In one configuration, the response 928 to the beam failure warning report 924 may be transmitted and received via a fourth MAC-CE or a third DCI message. In one configuration, the response 928 to the beam failure warning report 924 may include an indication of a beam switch.

At 930, the UE 902 may identify that the existing DRX OFF period is greater than a predetermined multiple of a second DRX ON period.

At 932, the UE 902 may wake up for a second time period during the existing DRX OFF period in response to identifying that the existing DRX OFF period is greater than the predetermined multiple of the second DRX ON period.

At 934, the UE 902 may transmit, to the network node 904, and the network node 904 may receive, from the UE 902, via a fifth MAC-CE or a third UCI message, an indication of the waking up. The waking up of the UE may be based on the existing DRX OFF period being greater than a predetermined multiple of a second DRX ON period. The indication of the waking up may include an indication that the waking up is based on one or more preconfigured parameters or an indication that the waking up corresponds to an early beginning of a third DRX ON period immediately following the existing DRX OFF period.

At 936, the UE 902 may monitor for a response to the indication of the waking up from the network node 904.

At 938, the network node 904 may transmit, to the UE 902, and the UE 902 may receive, from the network node 904, a response to the indication 934 of the waking up.

Figure 10:
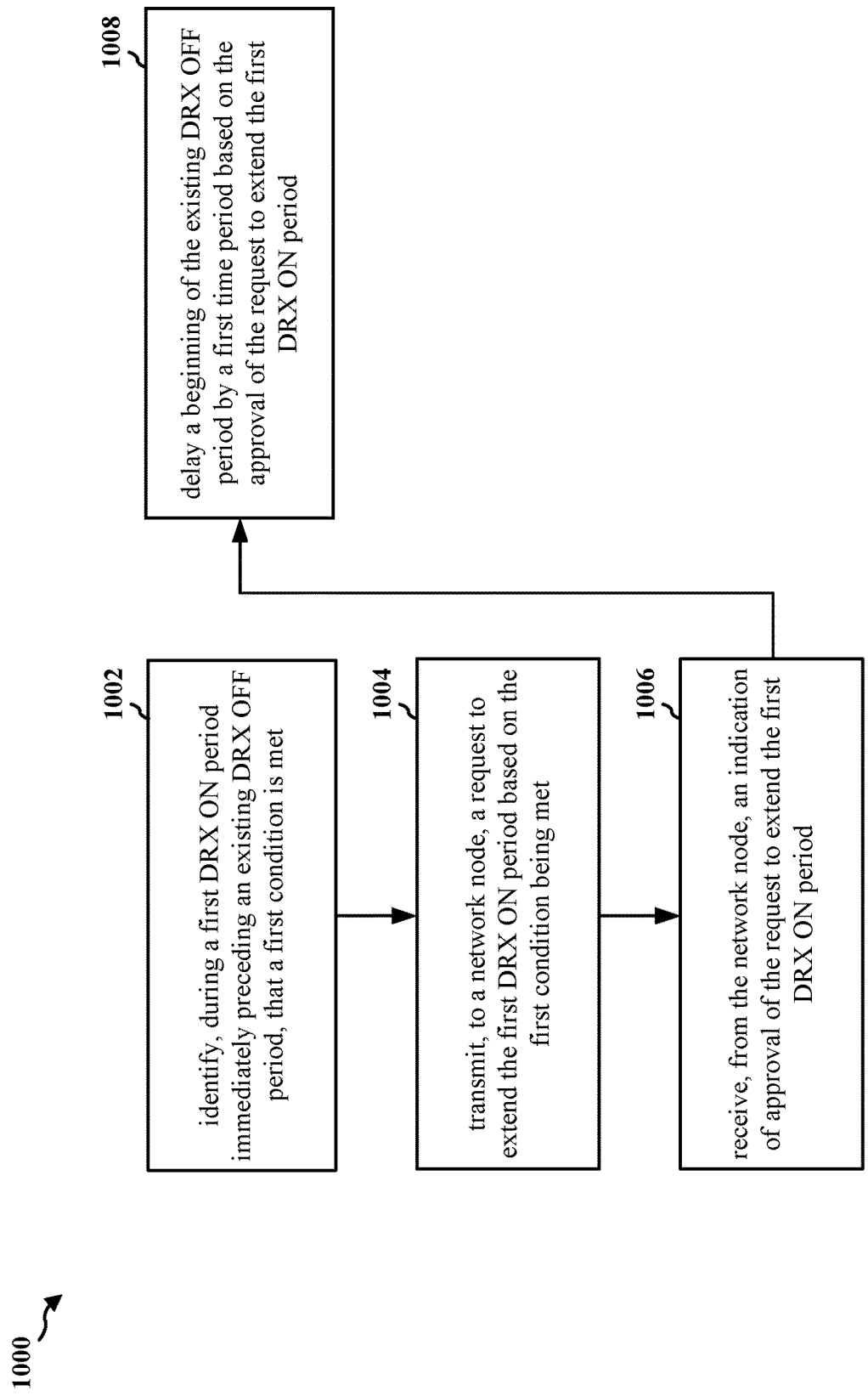
FIG. 10 is a flowchart of a method of wireless communication.

FIG. 10 is a flowchart 1000 of a method of wireless communication. The method may be performed by a UE (e.g., the UE 104/350/902; the apparatus 1404). At 1002, the UE may identify, during a first DRX ON period immediately preceding an existing DRX OFF period, that a first condition is met. For example, 1002 may be performed by component 198 in FIG. 14. Referring to FIG. 9, at 914, the UE 902 may identify, during a first DRX ON period immediately preceding an existing DRX OFF period, that a first condition is met.

At 1004, the UE may transmit, to a network node, a request to extend the first DRX ON period based on the first condition being met. For example, 1004 may be performed by component 198 in FIG. 14. Referring to FIG. 9, at 916, the UE 902 may transmit, to a network node 904, a request to extend the first DRX ON period based on the first condition being met.

At 1006, the UE may receive, from the network node, an indication of approval of the request to extend the first DRX ON period. For example, 1006 may be performed by component 198 in FIG. 14. Referring to FIG. 9, at 918, the UE 902 may receive, from the network node 904, an indication of approval of the request to extend the first DRX ON period.

At 1008, the UE may delay a beginning of the existing DRX OFF period by a first time period based on the approval of the request to extend the first DRX ON period. For example, 1008 may be performed by component 198 in FIG. 14. Referring to FIG. 9, at 920, the UE 902 may delay a beginning of the existing DRX OFF period by a first time period based on the approval of the request to extend the first DRX ON period.

Figure 11:
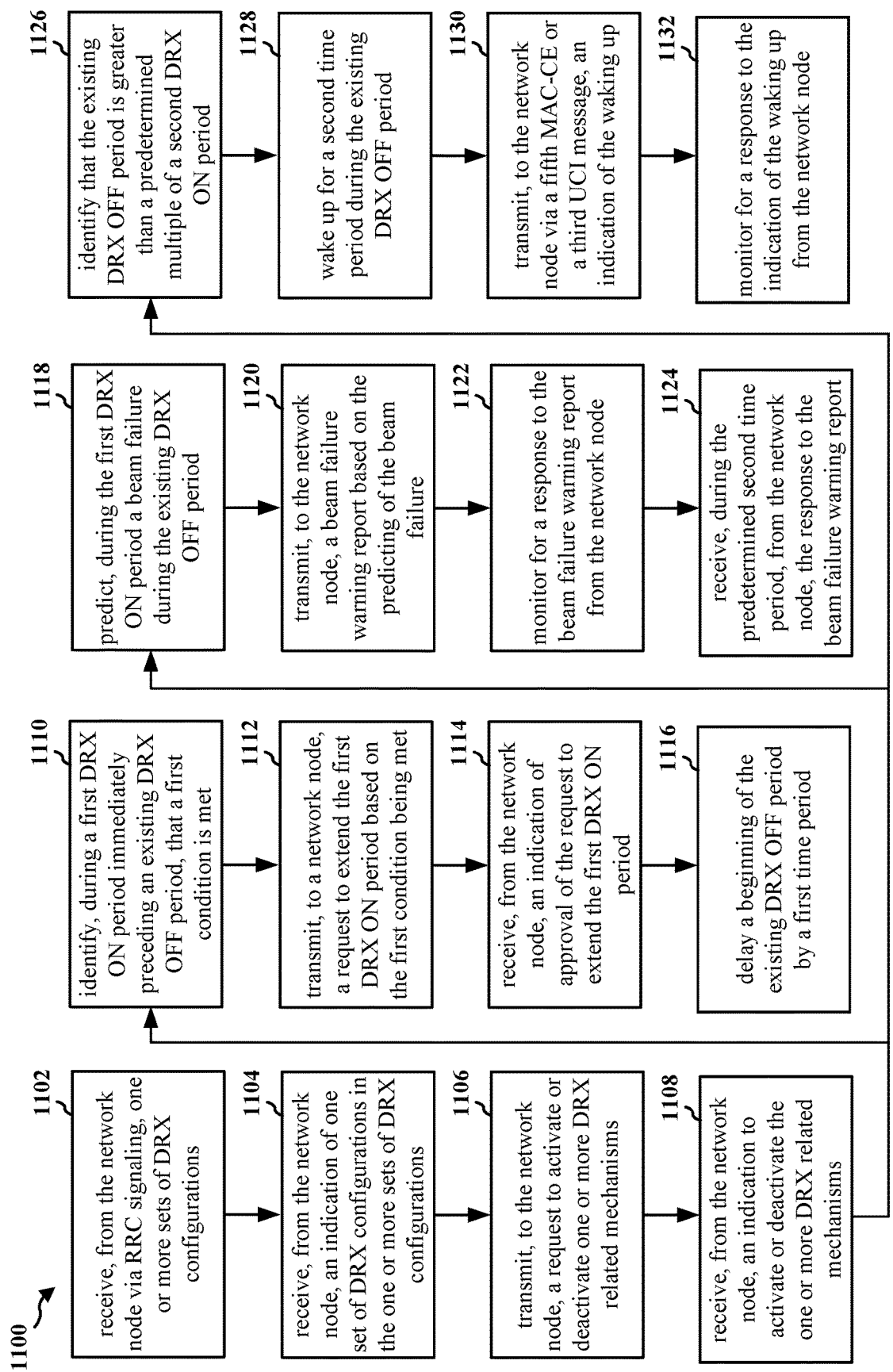
FIG. 11 is a flowchart of a method of wireless communication.

FIG. 11 is a flowchart 1100 of a method of wireless communication. The method may be performed by a UE (e.g., the UE 104/350/902; the apparatus 1404). At 1110, the UE may identify, during a first DRX ON period immediately preceding an existing DRX OFF period, that a first condition is met. For example, 1110 may be performed by component 198 in FIG. 14. Referring to FIG. 9, at 914, the UE 902 may identify, during a first DRX ON period immediately preceding an existing DRX OFF period, that a first condition is met.

At 1112, the UE may transmit, to a network node, a request to extend the first DRX ON period based on the first condition being met. For example, 1112 may be performed by component 198 in FIG. 14. Referring to FIG. 9, at 916, the UE 902 may transmit, to a network node 904, a request to extend the first DRX ON period based on the first condition being met.

At 1114, the UE may receive, from the network node, an indication of approval of the request to extend the first DRX ON period. For example, 1114 may be performed by component 198 in FIG. 14. Referring to FIG. 9, at 918, the UE 902 may receive, from the network node 904, an indication of approval of the request to extend the first DRX ON period.

At 1116, the UE may delay a beginning of the existing DRX OFF period by a first time period based on the approval of the request to extend the first DRX ON period. For example, 1116 may be performed by component 198 in FIG. 14. Referring to FIG. 9, at 920, the UE 902 may delay a beginning of the existing DRX OFF period by a first time period based on the approval of the request to extend the first DRX ON period.

In one configuration, referring to FIG. 9, the request 916 to extend the first DRX ON period may be transmitted to the network node 904 via a first MAC-CE or a first UCI message.

In one configuration, the approval of the request to extend the first DRX ON period may include an indication of the first time period.

In one configuration, referring to FIG. 9, the indication 918 of the approval of the request to extend the first DRX ON period may be received form the network node 904 via a PDCCH.

In one configuration, referring to FIG. 9, the first condition may be met if a first number of BFI indicators is greater than a first threshold, a second number of consecutive BFI indicators is greater than a second threshold, a channel strength decreases by more than a third threshold, the UE 902 has more data to transmit to the network node 904 during the first DRX ON period than possible without extending the first DRX ON period, the network node 904 has more data to transmit to the UE 902 during the first DRX ON period than possible without extending the first DRX ON period, or the UE 902 predicts a beam failure during the existing DRX OFF period.

In one configuration, at 1102, the UE may receive, from the network node via RRC signaling, one or more sets of DRX configurations. For example, 1102 may be performed by component 198 in FIG. 14. Referring to FIG. 9, at 906, the UE 902 may receive, from the network node 904 via RRC signaling, one or more sets of DRX configurations.

At 1104, the UE may receive, from the network node via a second MAC-CE or a first DCI message, an indication of one set of DRX configurations in the one or more sets of DRX configurations. For example, 1104 may be performed by component 198 in FIG. 14. Referring to FIG. 9, at 908, the UE 902 may receive, from the network node 904 via a second MAC-CE or a first DCI message, an indication of one set of DRX configurations in the one or more sets of DRX configurations.

In one configuration, at least one set of DRX configurations in the one or more sets of DRX configurations may include at least one of a DRX ON period extension configuration, a beam failure warning configuration, or a supplemental DRX wakeup configuration.

In one configuration, at 1106, the UE may transmit, to the network node via a third MAC-CE or a second UCI message, a request to activate or deactivate one or more DRX related mechanisms. For example, 1106 may be performed by component 198 in FIG. 14. Referring to FIG. 9, at 910, the UE 902 may transmit, to the network node 904 via a third MAC-CE or a second UCI message, a request to activate or deactivate one or more DRX related mechanisms.

At 1108, the UE may receive, from the network node via a fourth MAC-CE or a second DCI message, an indication to activate or deactivate the one or more DRX related mechanisms. For example, 1108 may be performed by component 198 in FIG. 14. Referring to FIG. 9, at 912, the UE 902 may receive, from the network node 904 via a fourth MAC-CE or a second DCI message, an indication to activate or deactivate the one or more DRX related mechanisms.

In one configuration, the one or more DRX related mechanisms may include one or more of a DRX ON period extension mechanism, a beam failure warning mechanism, or a supplemental DRX wakeup mechanism.

In one configuration, at 1118, the UE may predict, during the first DRX ON period a beam failure during the existing DRX OFF period. For example, 1118 may be performed by component 198 in FIG. 14. Referring to FIG. 9, at 922, the UE 902 may predict, during the first DRX ON period a beam failure during the existing DRX OFF period.

At 1120, the UE may transmit, to the network node, a beam failure warning report based on the predicting of the beam failure. For example, 1120 may be performed by component 198 in FIG. 14. Referring to FIG. 9, at 924, the UE 902 may transmit, to the network node 904, a beam failure warning report based on the predicting of the beam failure.

At 1122, the UE may monitor, for a predetermined second time period during the existing DRX OFF period after an expiry of a first timer, for a response to the beam failure warning report from the network node. The first timer may be started at the beginning of the existing DRX OFF period. For example, 1122 may be performed by component 198 in FIG. 14. Referring to FIG. 9, at 926, the UE 902 may monitor, for a predetermined second time period during the existing DRX OFF period after an expiry of a first timer, for a response to the beam failure warning report from the network node 904.

At 1124, the UE may receive, during the predetermined second time period, from the network node, the response to the beam failure warning report. For example, 1124 may be performed by component 198 in FIG. 14. Referring to FIG. 9, at 928, the UE 902 may receive, during the predetermined second time period, from the network node 904, the response to the beam failure warning report 924.

In one configuration, referring to FIG. 9, the response 928 to the beam failure warning report 924 may be received from the network node 904 via a fourth MAC-CE or a third DCI message.

In one configuration, referring to FIG. 9, the response 928 to the beam failure warning report 924 may include an indication of a beam switch.

In one configuration, referring to FIG. 9, the beam failure warning report 924 may include at least one of a channel measurement report, a BFI count, a BFI pattern, or a BFI history.

In one configuration, at 1126, the UE may identify that the existing DRX OFF period is greater than a predetermined multiple of a second DRX ON period. For example, 1126 may be performed by component 198 in FIG. 14. Referring to FIG. 9, at 930, the UE 902 may identify that the existing DRX OFF period is greater than a predetermined multiple of a second DRX ON period.

At 1128, the UE may wake up for a second time period during the existing DRX OFF period in response to identifying that the existing DRX OFF period is greater than the predetermined multiple of the second DRX ON period. For example, 1128 may be performed by component 198 in FIG. 14. Referring to FIG. 9, at 932, the UE 902 may wake up for a second time period during the existing DRX OFF period in response to identifying that the existing DRX OFF period is greater than the predetermined multiple of the second DRX ON period.

At 1130, the UE may transmit, to the network node via a fifth MAC-CE or a third UCI message, an indication of the waking up. The indication of the waking up may include an indication that the waking up is based on one or more preconfigured parameters or an indication that the waking up corresponds to an early beginning of a third DRX ON period immediately following the existing DRX OFF period. For example, 1130 may be performed by component 198 in FIG. 14. Referring to FIG. 9, at 934, the UE 902 may transmit, to the network node 904 via a fifth MAC-CE or a third UCI message, an indication of the waking up.

At 1132, the UE may monitor for a response to the indication of the waking up from the network node. For example, 1132 may be performed by component 198 in FIG. 14. Referring to FIG. 9, at 936, the UE 902 may monitor for a response to the indication of the waking up from the network node 904.

Figure 12:
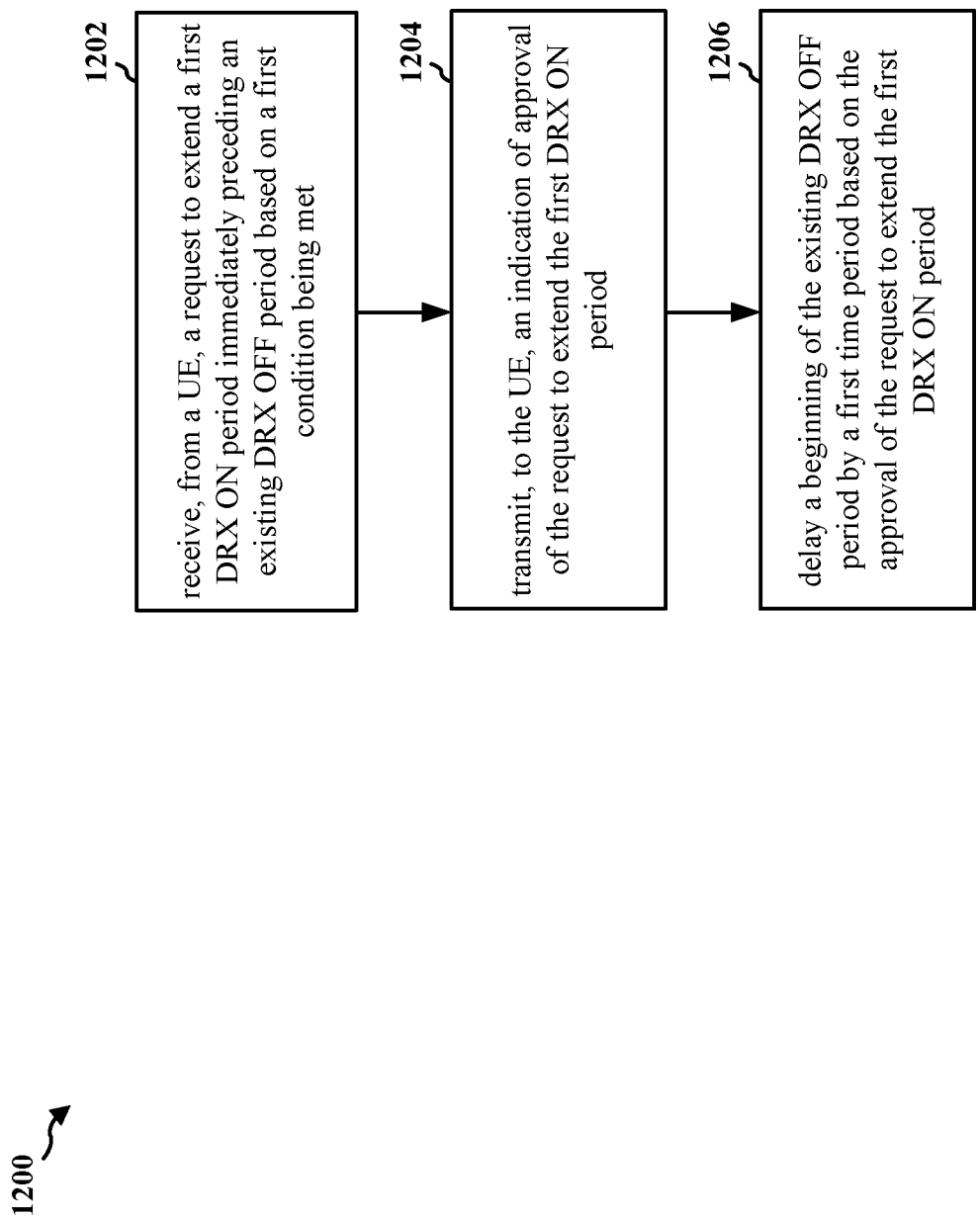
FIG. 12 is a flowchart of a method of wireless communication.

FIG. 12 is a flowchart 1200 of a method of wireless communication. The method may be performed by a base station/network node (e.g., the base station/network node 102/310/904; the network entity 1502). At 1202, the network node may receive, from a UE, a request to extend a first DRX ON period immediately preceding an existing DRX OFF period based on a first condition being met. For example, 1202 may be performed by the component 199 in FIG. 15. Referring to FIG. 9, at 916, the network node 904 may receive, from a UE 902, a request to extend a first DRX ON period immediately preceding an existing DRX OFF period based on a first condition being met.

At 1204, the network node may transmit, to the UE, an indication of approval of the request to extend the first DRX ON period. For example, 1204 may be performed by the component 199 in FIG. 15. Referring to FIG. 9, at 918, the network node 904 may transmit, to the UE 902, an indication of approval of the request to extend the first DRX ON period.

At 1206, the network node may delay a beginning of the existing DRX OFF period by a first time period based on the approval of the request to extend the first DRX ON period. For example, 1206 may be performed by the component 199 in FIG. 15. Referring to FIG. 9, at 920, the network node 904 may delay a beginning of the existing DRX OFF period by a first time period based on the approval of the request to extend the first DRX ON period.

Figure 13:
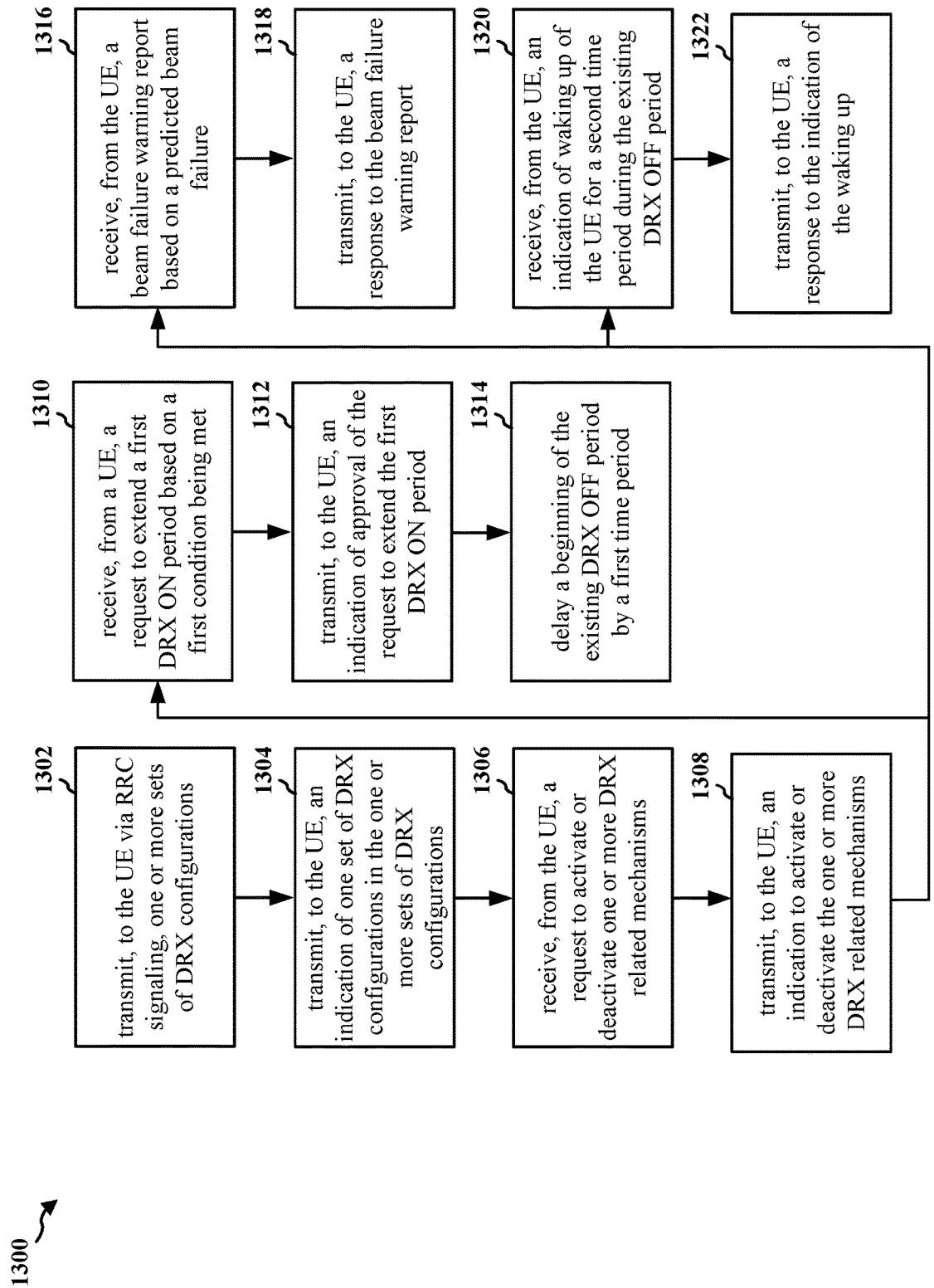
FIG. 13 is a flowchart of a method of wireless communication.

FIG. 13 is a flowchart 1300 of a method of wireless communication. The method may be performed by a base station/network node (e.g., the base station/network node 102/310/904; the network entity 1502). At 1310, the network node may receive, from a UE, a request to extend a first DRX ON period immediately preceding an existing DRX OFF period based on a first condition being met. For example, 1310 may be performed by the component 199 in FIG. 15. Referring to FIG. 9, at 916, the network node 904 may receive, from a UE 902, a request to extend a first DRX ON period immediately preceding an existing DRX OFF period based on a first condition being met.

At 1312, the network node may transmit, to the UE, an indication of approval of the request to extend the first DRX ON period. For example, 1312 may be performed by the component 199 in FIG. 15. Referring to FIG. 9, at 918, the network node 904 may transmit, to the UE 902, an indication of approval of the request to extend the first DRX ON period.

At 1314, the network node may delay a beginning of the existing DRX OFF period by a first time period based on the approval of the request to extend the first DRX ON period. For example, 1314 may be performed by the component 199 in FIG. 15. Referring to FIG. 9, at 920, the network node 904 may delay a beginning of the existing DRX OFF period by a first time period based on the approval of the request to extend the first DRX ON period.

In one configuration, referring to FIG. 9, the request 916 to extend the first DRX ON period may be received from the UE 902 via a first MAC-CE or a first UCI message.

In one configuration, the approval of the request to extend the first DRX ON period may include an indication of the first time period.

In one configuration, referring to FIG. 9, the indication 918 of the approval of the request to extend the first DRX ON period may be transmitted to the UE 902 via a PDCCH.

In one configuration, referring to FIG. 9, the first condition may be met if: a first number of BFI indicators is greater than a first threshold, a second number of consecutive BFI indicators is greater than a second threshold, a channel strength decreases by more than a third threshold, the UE 902 has more data to transmit to the network node 904 during the first DRX ON period than possible without extending the first DRX ON period, the network node 904 has more data to transmit to the UE 902 during the first DRX ON period than possible without extending the first DRX ON period, or the UE 902 predicts a beam failure during the existing DRX OFF period.

In one configuration, at 1302, the network node may transmit, to the UE via RRC signaling, one or more sets of DRX configurations. For example, 1302 may be performed by the component 199 in FIG. 15. Referring to FIG. 9, at 906, the network node 904 may transmit, to the UE 902 via RRC signaling, one or more sets of DRX configurations.

At 1304, the network node may transmit, to the UE via a second MAC-CE or a first DCI message, an indication of one set of DRX configurations in the one or more sets of DRX configurations. For example, 1304 may be performed by the component 199 in FIG. 15. Referring to FIG. 9, at 908, the network node 904 may transmit, to the UE 902 via a second MAC-CE or a first DCI message, an indication of one set of DRX configurations in the one or more sets of DRX configurations.

In one configuration, referring to FIG. 9, at least one set of DRX configurations in the one or more sets of DRX configurations 906 may include at least one of a DRX ON period extension configuration, a beam failure warning configuration, or a supplemental DRX wakeup configuration.

In one configuration, at 1306, the network node may receive, from the UE via a third MAC-CE or a second UCI message, a request to activate or deactivate one or more DRX related mechanisms. For example, 1306 may be performed by the component 199 in FIG. 15. Referring to FIG. 9, at 910, the network node 904 may receive, from the UE 902 via a third MAC-CE or a second UCI message, a request to activate or deactivate one or more DRX related mechanisms.

At 1308, the network node may transmit, to the UE via a fourth MAC-CE or a second DCI message, an indication to activate or deactivate the one or more DRX related mechanisms. For example, 1308 may be performed by the component 199 in FIG. 15. Referring to FIG. 9, at 912, the network node 904 may transmit, to the UE 902 via a fourth MAC-CE or a second DCI message, an indication to activate or deactivate the one or more DRX related mechanisms.

In one configuration, the one or more DRX related mechanisms may include one or more of a DRX ON period extension mechanism, a beam failure warning mechanism, or a supplemental DRX wakeup mechanism.

In one configuration, at 1316, the network node may receive, from the UE, a beam failure warning report based on a predicted beam failure. For example, 1316 may be performed by the component 199 in FIG. 15. Referring to FIG. 9, at 924, the network node 904 may receive, from the UE 902, a beam failure warning report based on a predicted beam failure.

At 1318, the network node may transmit, during a predetermined second time period during the existing DRX OFF period after an expiry of a first timer, to the UE, a response to the beam failure warning report. The first timer may be started at the beginning of the existing DRX OFF period. For example, 1318 may be performed by the component 199 in FIG. 15. Referring to FIG. 9, at 928, the network node 904 may transmit, during a predetermined second time period during the existing DRX OFF period after an expiry of a first timer, to the UE 902, a response to the beam failure warning report 924.

In one configuration, referring to FIG. 9, the response 928 to the beam failure warning report 924 may be transmitted to the UE 902 via a fourth MAC-CE or a third DCI message.

In one configuration, referring to FIG. 9, the response 928 to the beam failure warning report 924 may include an indication of a beam switch.

In one configuration, referring to FIG. 9, the beam failure warning report 924 may include at least one of a channel measurement report, a BFI count, a BFI pattern, or a BFI history.

In one configuration, at 1320, the network node may receive, from the UE via a fifth MAC-CE or a third UCI message, an indication of waking up of the UE for a second time period during the existing DRX OFF period. The waking up of the UE may be based on the existing DRX OFF period being greater than a predetermined multiple of a second DRX ON period. The indication of the waking up may include an indication that the waking up is based on one or more preconfigured parameters or an indication that the waking up corresponds to an early beginning of a third DRX ON period immediately following the existing DRX OFF period. For example, 1320 may be performed by the component 199 in FIG. 15. Referring to FIG. 9, at 934, the network node 904 may receive, from the UE 902 via a fifth MAC-CE or a third UCI message, an indication of waking up of the UE 902 for a second time period during the existing DRX OFF period.

At 1322, the network node may transmit, to the UE, a response to the indication of the waking up. For example, 1322 may be performed by the component 199 in FIG. 15. Referring to FIG. 9, at 938, the network node 904 may transmit, to the UE 902, a response to the indication 934 of the waking up.

Figure 14:
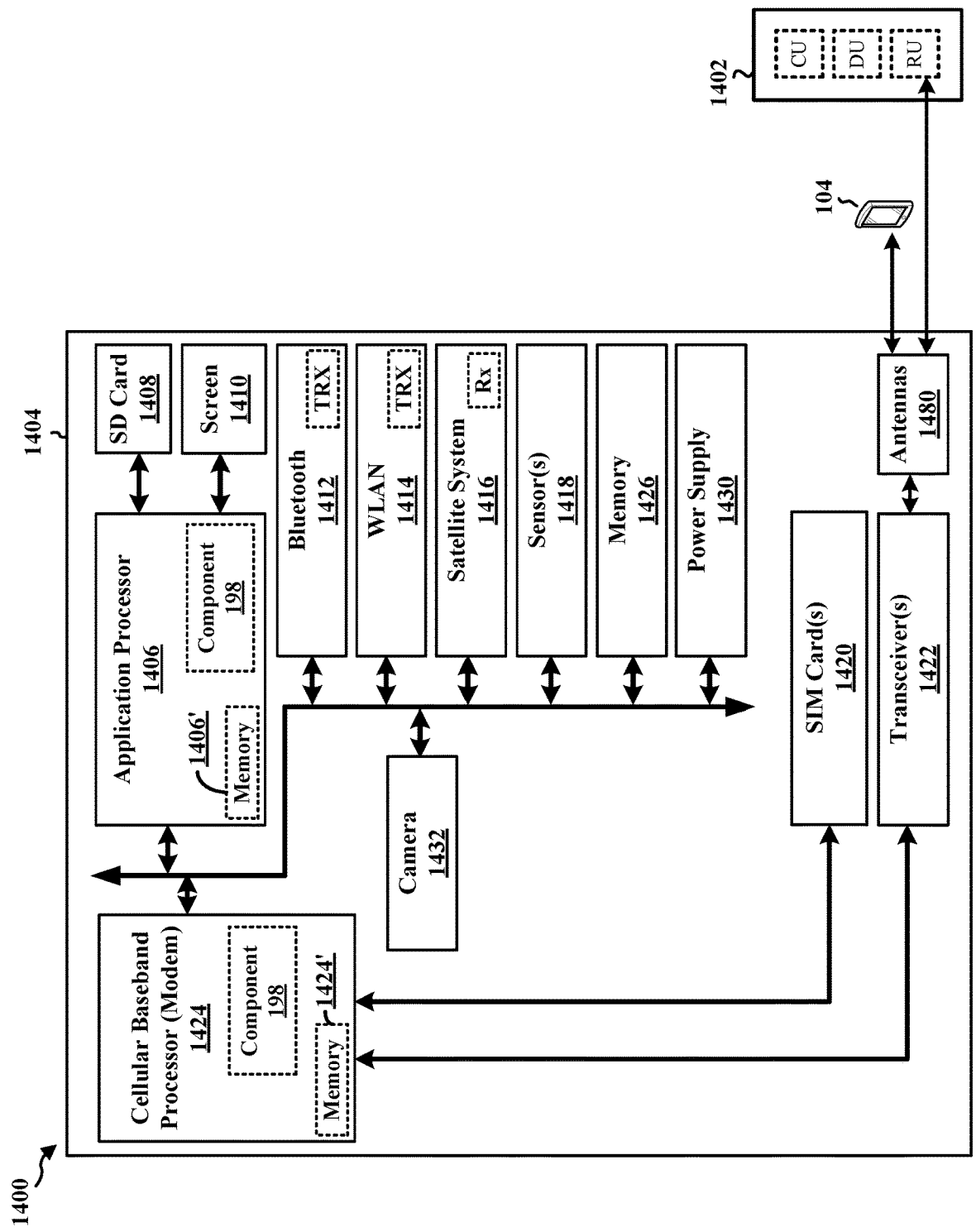
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, a satellite system module 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the satellite system module 1416 may include an on-chip transceiver (TRX)/receiver (RX). The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to identify, during a first DRX ON period immediately preceding an existing DRX OFF period, that a first condition is met. The component 198 may be configured to transmit, to a network node, a request to extend the first DRX ON period based on the first condition being met. The component 198 may be configured to receive, from the network node, an indication of approval of the request to extend the first DRX ON period. The component 198 may be configured to delay a beginning of the existing DRX OFF period by a first time period based on the approval of the request to extend the first DRX ON period. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for identifying, during a first DRX ON period immediately preceding an existing DRX OFF period, that a first condition is met. The apparatus 1404, and in particular the cellular baseband processor 1424 and/or the application processor 1406, includes means for transmitting, to a network node, a request to extend the first DRX ON period based on the first condition being met. The apparatus 1404, and in particular the cellular baseband processor 1424 and/or the application processor 1406, includes means for receiving, from the network node, an indication of approval of the request to extend the first DRX ON period. The apparatus 1404, and in particular the cellular baseband processor 1424 and/or the application processor 1406, includes means for delaying a beginning of the existing DRX OFF period by a first time period based on the approval of the request to extend the first DRX ON period.

In one configuration, the request to extend the first DRX ON period may be transmitted to the network node via a first MAC-CE or a first UCI message. In one configuration, the approval of the request to extend the first DRX ON period may include an indication of the first time period. In one configuration, the indication of the approval of the request to extend the first DRX ON period may be received form the network node via a PDCCH. In one configuration, the first condition may be met if a first number of BFI indicators is greater than a first threshold, a second number of consecutive BFI indicators is greater than a second threshold, a channel strength decreases by more than a third threshold, the UE has more data to transmit to the network node during the first DRX ON period than possible without extending the first DRX ON period, the network node has more data to transmit to the UE during the first DRX ON period than possible without extending the first DRX ON period, or the UE predicts a beam failure during the existing DRX OFF period. In one configuration, the apparatus 1404, and in particular the cellular baseband processor 1424 and/or the application processor 1406, includes means for receiving, from the network node via RRC signaling, one or more sets of DRX configurations. The apparatus 1404, and in particular the cellular baseband processor 1424 and/or the application processor 1406, includes means for receiving, from the network node via a second MAC-CE or a first DCI message, an indication of one set of DRX configurations in the one or more sets of DRX configurations. In one configuration, at least one set of DRX configurations in the one or more sets of DRX configurations may include at least one of a DRX ON period extension configuration, a beam failure warning configuration, or a supplemental DRX wakeup configuration. In one configuration, the apparatus 1404, and in particular the cellular baseband processor 1424 and/or the application processor 1406, includes means for transmitting, to the network node via a third MAC-CE or a second UCI message, a request to activate or deactivate one or more DRX related mechanisms. The apparatus 1404, and in particular the cellular baseband processor 1424 and/or the application processor 1406, includes means for receiving, from the network node via a fourth MAC-CE or a second DCI message, an indication to activate or deactivate the one or more DRX related mechanisms. In one configuration, the one or more DRX related mechanisms may include one or more of a DRX ON period extension mechanism, a beam failure warning mechanism, or a supplemental DRX wakeup mechanism. In one configuration, the apparatus 1404, and in particular the cellular baseband processor 1424 and/or the application processor 1406, includes means for predicting, during the first DRX ON period a beam failure during the existing DRX OFF period. The apparatus 1404, and in particular the cellular baseband processor 1424 and/or the application processor 1406, includes means for transmitting, to the network node, a beam failure warning report based on the predicting of the beam failure. The apparatus 1404, and in particular the cellular baseband processor 1424 and/or the application processor 1406, includes means for monitoring, for a predetermined second time period during the existing DRX OFF period after an expiry of a first timer, for a response to the beam failure warning report from the network node. The first timer may be started at the beginning of the existing DRX OFF period. The apparatus 1404, and in particular the cellular baseband processor 1424 and/or the application processor 1406, includes means for receiving, during the predetermined second time period, from the network node, the response to the beam failure warning report. In one configuration, the response to the beam failure warning report may be received from the network node via a fourth MAC-CE or a third DCI message. In one configuration, the response to the beam failure warning report may include an indication of a beam switch. In one configuration, the beam failure warning report may include at least one of a channel measurement report, a BFI count, a BFI pattern, or a BFI history. In one configuration, the apparatus 1404, and in particular the cellular baseband processor 1424 and/or the application processor 1406, includes means for identifying that the existing DRX OFF period is greater than a predetermined multiple of a second DRX ON period. The apparatus 1404, and in particular the cellular baseband processor 1424 and/or the application processor 1406, includes means for waking up for a second time period during the existing DRX OFF period in response to identifying that the existing DRX OFF period is greater than the predetermined multiple of the second DRX ON period. The apparatus 1404, and in particular the cellular baseband processor 1424 and/or the application processor 1406, includes means for transmitting, to the network node via a fifth MAC-CE or a third UCI message, an indication of the waking up. The indication of the waking up may include an indication that the waking up is based on one or more preconfigured parameters or an indication that the waking up corresponds to an early beginning of a third DRX ON period immediately following the existing DRX OFF period. The apparatus 1404, and in particular the cellular baseband processor 1424 and/or the application processor 1406, includes means for monitoring for a response to the indication of the waking up from the network node.

The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
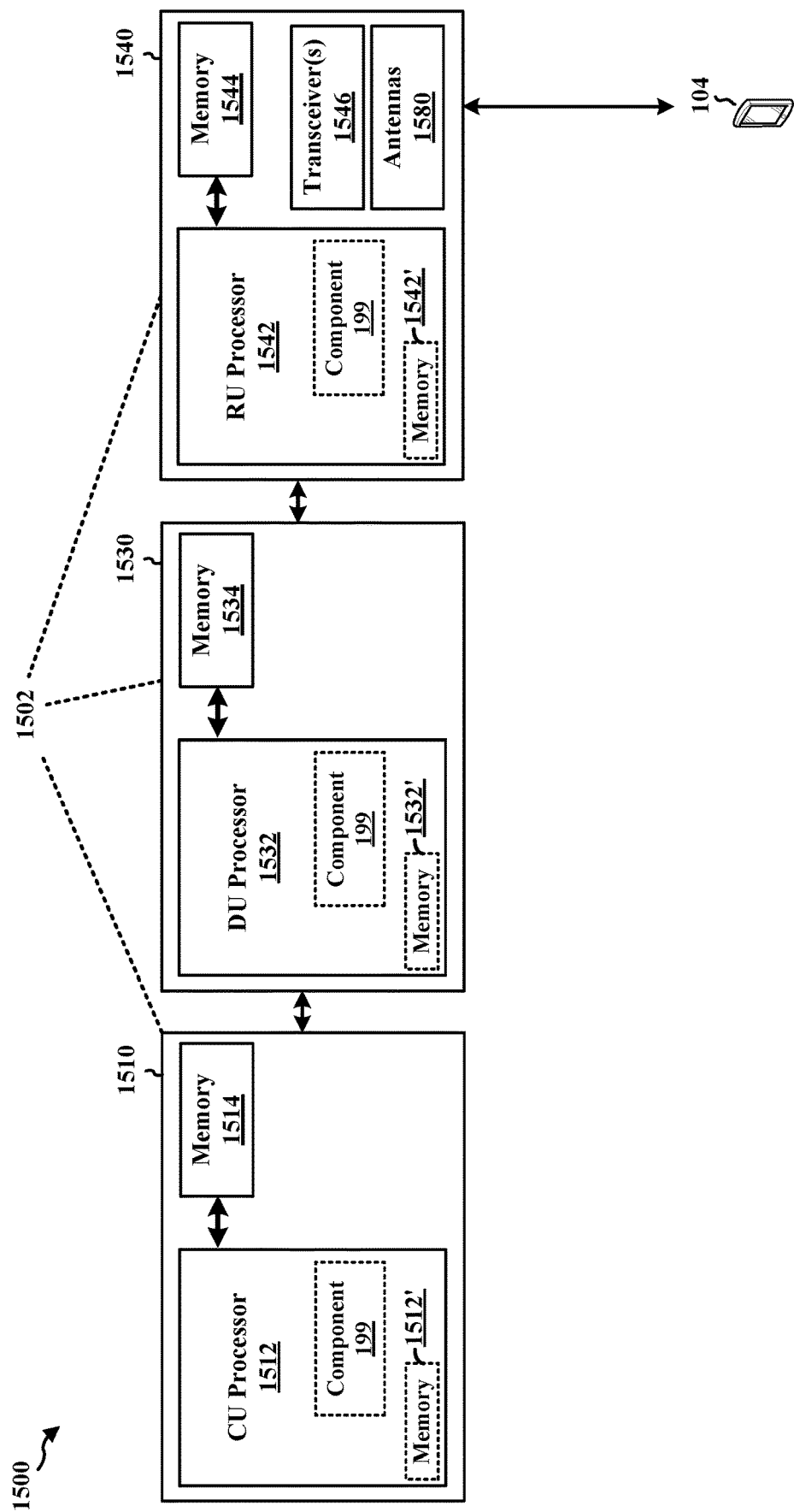
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514. The CU 1510 communicates with the DU 1530. The DU 1530 may include a DU processor 1532. The DU processor 1532 may include on-chip memory 1532'. In some aspects, the DU 1530 may further include additional memory modules 1534. The DU 1530 communicates with the RU 1540. The RU 1540 may include an RU processor 1542. The RU processor 1542 may include on-chip memory 1542'. In some aspects, the RU 1540 may further include additional memory modules 1544, one or more transceivers 1546, and antennas 1580. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive, from a UE, a request to extend a first DRX ON period immediately preceding an existing DRX OFF period based on a first condition being met. The component 199 may be configured to transmit, to the UE, an indication of approval of the request to extend the first DRX ON period. The component 199 may be configured to delay a beginning of the existing DRX OFF period by a first time period based on the approval of the request to extend the first DRX ON period. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for receiving, from a UE, a request to extend a first DRX ON period immediately preceding an existing DRX OFF period based on a first condition being met. The network entity 1502 includes means for transmitting, to the UE, an indication of approval of the request to extend the first DRX ON period. The network entity 1502 includes means for delaying a beginning of the existing DRX OFF period by a first time period based on the approval of the request to extend the first DRX ON period.

In one configuration, the request to extend the first DRX ON period may be received from the UE via a first MAC-CE or a first UCI message. In one configuration, the approval of the request to extend the first DRX ON period may include an indication of the first time period. In one configuration, the indication of the approval of the request to extend the first DRX ON period may be transmitted to the UE via a PDCCH. In one configuration, the first condition may be met if: a first number of BFI indicators is greater than a first threshold, a second number of consecutive BFI indicators is greater than a second threshold, a channel strength decreases by more than a third threshold, the UE has more data to transmit to the network node during the first DRX ON period than possible without extending the first DRX ON period, the network node has more data to transmit to the UE during the first DRX ON period than possible without extending the first DRX ON period, or the UE predicts a beam failure during the existing DRX OFF period. In one configuration, the network entity 1502 includes means for transmitting, to the UE via RRC signaling, one or more sets of DRX configurations. The network entity 1502 includes means for transmitting, to the UE via a second MAC-CE or a first DCI message, an indication of one set of DRX configurations in the one or more sets of DRX configurations. In one configuration, at least one set of DRX configurations in the one or more sets of DRX configurations may include at least one of a DRX ON period extension configuration, a beam failure warning configuration, or a supplemental DRX wakeup configuration. In one configuration, the network entity 1502 includes means for receiving, from the UE via a third MAC-CE or a second UCI message, a request to activate or deactivate one or more DRX related mechanisms. The network entity 1502 includes means for transmitting, to the UE via a fourth MAC-CE or a second DCI message, an indication to activate or deactivate the one or more DRX related mechanisms. In one configuration, the one or more DRX related mechanisms may include one or more of a DRX ON period extension mechanism, a beam failure warning mechanism, or a supplemental DRX wakeup mechanism. In one configuration, the network entity 1502 includes means for receiving, from the UE, a beam failure warning report based on a predicted beam failure. The network entity 1502 includes means for transmitting, during a predetermined second time period during the existing DRX OFF period after an expiry of a first timer, to the UE, a response to the beam failure warning report. The first timer may be started at the beginning of the existing DRX OFF period. In one configuration, the response to the beam failure warning report may be transmitted to the UE via a fourth MAC-CE or a third DCI message. In one configuration, the response to the beam failure warning report may include an indication of a beam switch. In one configuration, the beam failure warning report may include at least one of a channel measurement report, a BFI count, a BFI pattern, or a BFI history. In one configuration, the network entity 1502 includes means for receiving, from the UE via a fifth MAC-CE or a third UCI message, an indication of waking up of the UE for a second time period during the existing DRX OFF period. The waking up of the UE may be based on the existing DRX OFF period being greater than a predetermined multiple of a second DRX ON period. The indication of the waking up may include an indication that the waking up is based on one or more preconfigured parameters or an indication that the waking up corresponds to an early beginning of a third DRX ON period immediately following the existing DRX OFF period. The network entity 1502 includes means for transmitting, to the UE, a response to the indication of the waking up.

The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-15, a UE may identify, during a first DRX ON period immediately preceding an existing DRX OFF period, that a first condition is met. The UE may transmit, to a network node, and the network node may receive, from the UE, a request to extend the first DRX ON period based on the first condition being met. The network node may transmit, to the UE, and the UE may receive, from the network node, an indication of approval of the request to extend the first DRX ON period. The UE and the network node may delay a beginning of the existing DRX OFF period by a first time period based on the approval of the request to extend the first DRX ON period. Accordingly, accuracy associated with the BFD/BFR procedures may be improved. Further, more time may be made available to the UE for BFD-RS monitoring during part of the originally scheduled DRX OFF period (the DRX ON extension period) in order to confirm beam failure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a UE, including identifying, during a first DRX ON period immediately preceding an existing DRX OFF period, that a first condition is met; transmitting, to a network node, a request to extend the first DRX ON period based on the first condition being met; receiving, from the network node, an indication of approval of the request to extend the first DRX ON period; and delaying a beginning of the existing DRX OFF period by a first time period based on the approval of the request to extend the first DRX ON period.

Aspect 2 is the method of aspect 1, where the request to extend the first DRX ON period is transmitted to the network node via a first MAC-CE or a first UCI message.

Aspect 3 is the method of any of aspects 1 and 2, where the approval of the request to extend the first DRX ON period includes an indication of the first time period.

Aspect 4 is the method of any of aspects 1 to 3, where the indication of the approval of the request to extend the first DRX ON period is received from the network node via a PDCCH.

Aspect 5 is the method of any of aspects 1 to 4, where the first condition is met if a first number of BFI indicators is greater than a first threshold, a second number of consecutive BFI indicators is greater than a second threshold, a channel strength decreases by more than a third threshold, the UE has more data to transmit to the network node during the first DRX ON period than possible without extending the first DRX ON period, the network node has more data to transmit to the UE during the first DRX ON period than possible without extending the first DRX ON period, or the UE predicts a beam failure during the existing DRX OFF period.

Aspect 6 is the method of any of aspects 1 to 5, further including: receiving, from the network node via RRC signaling, one or more sets of DRX configurations; and receiving, from the network node via a second MAC-CE or a first DCI message, an indication of one set of DRX configurations in the one or more sets of DRX configurations.

Aspect 7 is the method of aspect 6, where at least one set of DRX configurations in the one or more sets of DRX configurations includes at least one of a DRX ON period extension configuration, a beam failure warning configuration, or a supplemental DRX wakeup configuration.

Aspect 8 is the method of any of aspects 1 to 7, further including: transmitting, to the network node via a third MAC-CE or a second UCI message, a request to activate or deactivate one or more DRX related mechanisms; and receiving, from the network node via a fourth MAC-CE or a second DCI message, an indication to activate or deactivate the one or more DRX related mechanisms.

Aspect 9 is the method of aspect 8, where the one or more DRX related mechanisms include one or more of a DRX ON period extension mechanism, a beam failure warning mechanism, or a supplemental DRX wakeup mechanism.

Aspect 10 is the method of any of aspects 1 to 9, further including: predicting, during the first DRX ON period a beam failure during the existing DRX OFF period; transmitting, to the network node, a beam failure warning report based on the predicting of the beam failure; monitoring, for a predetermined second time period during the existing DRX OFF period after an expiry of a first timer, for a response to the beam failure warning report from the network node, the first timer being started at the beginning of the existing DRX OFF period; and receiving, during the predetermined second time period, from the network node, the response to the beam failure warning report.

Aspect 11 is the method of aspect 10, where the response to the beam failure warning report is received from the network node via a fourth MAC-CE or a third DCI message.

Aspect 12 is the method of any of aspects 10 and 11, where the response to the beam failure warning report includes an indication of a beam switch.

Aspect 13 is the method of any of aspects 10 to 12, where the beam failure warning report includes at least one of a channel measurement report, a BFI count, a BFI pattern, or a BFI history.

Aspect 14 is the method of any of aspects 1 to 13, including: identifying that the existing DRX OFF period is greater than a predetermined multiple of a second DRX ON period; waking up for a second time period during the existing DRX OFF period in response to identifying that the existing DRX OFF period is greater than the predetermined multiple of the second DRX ON period; transmitting, to the network node via a fifth MAC-CE or a third UCI message, an indication of the waking up, where the indication of the waking up includes an indication that the waking up is based on one or more preconfigured parameters or an indication that the waking up corresponds to an early beginning of a third DRX ON period immediately following the existing DRX OFF period; and monitoring for a response to the indication of the waking up from the network node.

Aspect 15 is a method of wireless communication at a network node, including receiving, from a UE, a request to extend a first DRX ON period immediately preceding an existing DRX OFF period based on a first condition being met; transmitting, to the UE, an indication of approval of the request to extend the first DRX ON period; and delaying a beginning of the existing DRX OFF period by a first time period based on the approval of the request to extend the first DRX ON period.

Aspect 16 is the method of aspect 15, where the request to extend the first DRX ON period is received from the UE via a first MAC-CE or a first UCI message.

Aspect 17 is the method of any of aspects 15 and 16, where the approval of the request to extend the first DRX ON period includes an indication of the first time period.

Aspect 18 is the method of any of aspects 15 to 17, where the indication of the approval of the request to extend the first DRX ON period is transmitted to the UE via a PDCCH.

Aspect 19 is the method of any of aspects 15 to 18, where the first condition is met if:

a first number of BFI indicators is greater than a first threshold, a second number of consecutive BFI indicators is greater than a second threshold, a channel strength decreases by more than a third threshold, the UE has more data to transmit to the network node during the first DRX ON period than possible without extending the first DRX ON period, the network node has more data to transmit to the UE during the first DRX ON period than possible without extending the first DRX ON period, or the UE predicts a beam failure during the existing DRX OFF period.

Aspect 20 is the method of any of aspects 15 to 19, further including: transmitting, to the UE via RRC signaling, one or more sets of DRX configurations; and transmitting, to the UE via a second MAC-CE or a first DCI message, an indication of one set of DRX configurations in the one or more sets of DRX configurations.

Aspect 21 is the method of aspect 20, where at least one set of DRX configurations in the one or more sets of DRX configurations includes at least one of a DRX ON period extension configuration, a beam failure warning configuration, or a supplemental DRX wakeup configuration.

Aspect 22 is the method of any of aspects 15 to 21, further including: receiving, from the UE via a third MAC-CE or a second UCI message, a request to activate or deactivate one or more DRX related mechanisms; and transmitting, to the UE via a fourth MAC-CE or a second DCI message, an indication to activate or deactivate the one or more DRX related mechanisms.

Aspect 23 is the method of aspect 22, where the one or more DRX related mechanisms include one or more of a DRX ON period extension mechanism, a beam failure warning mechanism, or a supplemental DRX wakeup mechanism.

Aspect 24 is the method of any of aspects 15 to 23, further including: receiving, from the UE, a beam failure warning report based on a predicted beam failure; and transmitting, during a predetermined second time period during the existing DRX OFF period after an expiry of a first timer, to the UE, a response to the beam failure warning report, the first timer being started at the beginning of the existing DRX OFF period.

Aspect 25 is the method of aspect 24, where the response to the beam failure warning report is transmitted to the UE via a fourth MAC-CE or a third DCI message.

Aspect 26 is the method of any of aspects 24 and 25, where the response to the beam failure warning report includes an indication of a beam switch.

Aspect 27 is the method of any of aspects 24 to 26, where the beam failure warning report includes at least one of a channel measurement report, a BFI count, a BFI pattern, or a BFI history.

Aspect 28 is the method of any of aspects 15 to 27, further including: receiving, from the UE via a fifth MAC-CE or a third UCI message, an indication of waking up of the UE for a second time period during the existing DRX OFF period, where the waking up of the UE is based on the existing DRX OFF period being greater than a predetermined multiple of a second DRX ON period, the indication of the waking up includes an indication that the waking up is based on one or more preconfigured parameters or an indication that the waking up corresponds to an early beginning of a third DRX ON period immediately following the existing DRX OFF period; and transmitting, to the UE, a response to the indication of the waking up.

What is claimed is:

1. An apparatus for wireless communication at a user equipment (UE), comprising:
   memory; and
   at least one processor coupled to the memory and, based at least in part on information stored in the memory, the at least one processor is configured to:
   identify, during a first discontinuous reception (DRX) ON period immediately preceding an existing DRX OFF period, that a first condition indicating a beam failure is met;
   transmit, to a network node, a request to extend the first DRX ON period based on the first condition being met;
   receive, from the network node, an indication of approval of the request to extend the first DRX ON period; and
   delay a beginning of the existing DRX OFF period by a first time period based on the approval of the request to extend the first DRX ON period.

2. The apparatus of claim 1, wherein to transmit the request to extend the first DRX ON period, the at least one processor is configured to transmit the request to extend the first DRX ON period to the network node via a first medium access control (MAC)-control element (CE) (MAC-CE) or a first uplink control information (UCI) message.

3. The apparatus of claim 1, wherein the approval of the request to extend the first DRX ON period comprises an indication of the first time period.

4. The apparatus of claim 1, wherein to receive the indication of the approval of the request to extend the first DRX ON period, the at least one processor is configured to receive the indication of the approval of the request to extend the first DRX ON period from the network node via a physical downlink control channel (PDCCH).

5. The apparatus of claim 1, wherein the first condition is met if:
   a first number of beam failure instance (BFI) indicators is greater than a first threshold,
   a second number of consecutive BFI indicators is greater than a second threshold,
   a channel strength decreases by more than a third threshold,
   the UE has more data to transmit to the network node during the first DRX ON period than possible without extending the first DRX ON period,
   the network node has more data to transmit to the UE during the first DRX ON period than possible without extending the first DRX ON period, or
   the UE predicts a beam failure during the existing DRX OFF period.

6. The apparatus of claim 1, the at least one processor being further configured to:
   receive, from the network node via radio resource control (RRC) signaling, one or more sets of DRX configurations; and
   receive, from the network node via a second medium access control (MAC)-control element (CE) (MAC-CE) or a first downlink control information (DCI) message, an indication of one set of DRX configurations in the one or more sets of DRX configurations.

7. The apparatus of claim 6, wherein at least one set of DRX configurations in the one or more sets of DRX configurations comprises at least one of a DRX ON period extension configuration, a beam failure warning configuration, or a supplemental DRX wakeup configuration.

8. The apparatus of claim 1, the at least one processor being further configured to:
   transmit, to the network node via a third medium access control (MAC)-control element (CE) (MAC-CE) or a second uplink control information (UCI) message, a request to activate or deactivate one or more DRX related mechanisms; and receive, from the network node via a fourth MAC-CE or a second DCI message, an indication to activate or deactivate the one or more DRX related mechanisms.

9. The apparatus of claim 8, wherein the one or more DRX related mechanisms comprise one or more of a DRX ON period extension mechanism, a beam failure warning mechanism, or a supplemental DRX wakeup mechanism.

10. The apparatus of claim 1, the at least one processor being further configured to:
predict, during the first DRX ON period a beam failure during the existing DRX OFF period;
transmit, to the network node, a beam failure warning report based on the predicting of the beam failure;
monitor, for a predetermined second time period during the existing DRX OFF period after an expiry of a first timer, for a response to the beam failure warning report from the network node, the first timer being started at the beginning of the existing DRX OFF period; and
receive, during the predetermined second time period, from the network node, the response to the beam failure warning report.

11. The apparatus of claim 10, wherein to receive the response to the beam failure warning report, the at least one processor is configured to receive the response to the beam failure warning report from the network node via a fourth medium access control (MAC)-control element (CE) (MAC-CE) or a third downlink control information (DCI) message.

12. The apparatus of claim 10, wherein the response to the beam failure warning report comprises an indication of a beam switch.

13. The apparatus of claim 10, wherein the beam failure warning report comprises at least one of a channel measurement report, a beam failure instance (BFI) count, a BFI pattern, or a BFI history.

14. The apparatus of claim 1, further comprising a transceiver coupled to the at least one processor, the at least one processor being further configured to:
identify that the existing DRX OFF period is greater than a predetermined multiple of a second DRX ON period;
wake up for a second time period during the existing DRX OFF period in response to identifying that the existing DRX OFF period is greater than the predetermined multiple of the second DRX ON period;
transmit, to the network node via a fifth medium access control (MAC)-control element (CE) (MAC-CE) or a third uplink control information (UCI) message, an indication of the waking up, wherein the indication of the waking up includes an indication that the waking up is based on one or more preconfigured parameters or an indication that the waking up corresponds to an early beginning of a third DRX ON period immediately following the existing DRX OFF period; and
monitor for a response to the indication of the waking up from the network node.

15. A method of wireless communication at a user equipment (UE), comprising:
identifying, during a first discontinuous reception (DRX) ON period immediately preceding an existing DRX OFF period, that a first condition indicating a beam failure is met;
transmitting, to a network node, a request to extend the first DRX ON period;
receiving, from the network node, an indication of approval of the request to extend the first DRX ON period; and
delaying a beginning of the existing DRX OFF period by a first time period based on the approval of the request to extend the first DRX ON period.

16. An apparatus for wireless communication at a network node, comprising:
memory; and
at least one processor coupled to the memory and, based at least in part on information stored in the memory, the at least one processor is configured to:
receive, from a user equipment (UE), a request to extend a first discontinuous reception (DRX) ON period immediately preceding an existing DRX OFF period based on a first condition indicating a beam failure being met;
transmit, to the UE, an indication of approval of the request to extend the first DRX ON period; and
delay a beginning of the existing DRX OFF period by a first time period based on the approval of the request to extend the first DRX ON period.

17. The apparatus of claim 16, wherein to receive the request to extend the first DRX ON period, the at least one processor is configured to receive the request to extend the first DRX ON period from the UE via a first medium access control (MAC)-control element (CE) (MAC-CE) or a first uplink control information (UCI) message.

18. The apparatus of claim 16, wherein the approval of the request to extend the first DRX ON period comprises an indication of the first time period.

19. The apparatus of claim 16, wherein to transmit the indication of the approval of the request to extend the first DRX ON period, the at least one processor is configured to transmit the indication of the approval of the request to extend the first DRX ON period to the UE via a physical downlink control channel (PDCCH).

20. The apparatus of claim 16, wherein the first condition is met if:
a first number of beam failure instance (BFI) indicators is greater than a first threshold,
a second number of consecutive BFI indicators is greater than a second threshold,
a channel strength decreases by more than a third threshold,
the UE has more data to transmit to the network node during the first DRX ON period than possible without extending the first DRX ON period,
the network node has more data to transmit to the UE during the first DRX ON period than possible without extending the first DRX ON period, or
the UE predicts a beam failure during the existing DRX OFF period.

21. The apparatus of claim 16, the at least one processor being further configured to:
transmit, to the UE via radio resource control (RRC) signaling, one or more sets of DRX configurations; and
transmit, to the UE via a second medium access control (MAC)-control element (CE) (MAC-CE) or a first downlink control information (DCI) message, an indication of one set of DRX configurations in the one or more sets of DRX configurations.

22. The apparatus of claim 21, wherein at least one set of DRX configurations in the one or more sets of DRX configurations comprises at least one of a DRX ON period extension configuration, a beam failure warning configuration, or a supplemental DRX wakeup configuration.

23. The apparatus of claim 16, the at least one processor being further configured to:
- receive, from the UE via a third medium access control (MAC)-control element (CE) (MAC-CE) or a second uplink control information (UCI) message, a request to activate or deactivate one or more DRX related mechanisms; and
- transmit, to the UE via a fourth MAC-CE or a second DCI message, an indication to activate or deactivate the one or more DRX related mechanisms.

24. The apparatus of claim 23, wherein the one or more DRX related mechanisms comprise one or more of a DRX ON period extension mechanism, a beam failure warning mechanism, or a supplemental DRX wakeup mechanism.

25. The apparatus of claim 16, the at least one processor being further configured to:
- receive, from the UE, a beam failure warning report based on a predicted beam failure; and
- transmit, during a predetermined second time period during the existing DRX OFF period after an expiry of a first timer, to the UE, a response to the beam failure warning report, the first timer being started at the beginning of the existing DRX OFF period.

26. The apparatus of claim 25, wherein to transmit the response to the beam failure warning report, the at least one processor is configured to transmit the response to the beam failure warning report to the UE via a fourth medium access control (MAC)-control element (CE) (MAC-CE) or a third downlink control information (DCI) message.

27. The apparatus of claim 25, wherein the response to the beam failure warning report comprises an indication of a beam switch.

28. The apparatus of claim 25, wherein the beam failure warning report comprises at least one of a channel measurement report, a beam failure instance (BFI) count, a BFI pattern, or a BFI history.

29. The apparatus of claim 16, further comprising a transceiver coupled to the at least one processor, the at least one processor being further configured to:
- receive, from the UE via a fifth medium access control (MAC)-control element (CE) (MAC-CE) or a third uplink control information (UCI) message, an indication of waking up of the UE for a second time period during the existing DRX OFF period, wherein the waking up of the UE is based on the existing DRX OFF period being greater than a predetermined multiple of a second DRX ON period, the indication of the waking up includes an indication that the waking up is based on one or more preconfigured parameters or an indication that the waking up corresponds to an early beginning of a third DRX ON period immediately following the existing DRX OFF period; and
- transmit, to the UE, a response to the indication of the waking up.

30. A method of wireless communication at a network node, comprising:
- receiving, from a user equipment (UE), a request to extend a first discontinuous reception (DRX) ON period immediately preceding an existing DRX OFF period based on a first condition indicating a beam failure being met;
- transmitting, to the UE, an indication of approval of the request to extend the first DRX ON period; and
- delaying a beginning of the existing DRX OFF period by a first time period based on the approval of the request to extend the first DRX ON period.

* * * * *